United States Patent
Yaegashi et al.

(10) Patent No.: US 9,240,064 B2
(45) Date of Patent: Jan. 19, 2016

(54) IMAGE PROCESSING DEVICE, METHOD FOR CONTROLLING IMAGE PROCESSING DEVICE, PROGRAM, AND INFORMATION STORAGE MEDIUM

(75) Inventors: Keita Yaegashi, Tokyo (JP); Soh Masuko, Tokyo (JP); Shinya Takami, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/354,135

(22) PCT Filed: Jul. 19, 2012

(86) PCT No.: PCT/JP2012/068334
§ 371 (c)(1),
(2), (4) Date: Jul. 18, 2014

(87) PCT Pub. No.: WO2013/069341
PCT Pub. Date: May 16, 2013

(65) Prior Publication Data
US 2014/0327697 A1    Nov. 6, 2014

(30) Foreign Application Priority Data
Nov. 9, 2011    (JP) .................................. 2011-245871

(51) Int. Cl.
G09G 5/00    (2006.01)
G06T 11/60   (2006.01)
G06T 3/00    (2006.01)
G06T 7/00    (2006.01)

(52) U.S. Cl.
CPC . *G06T 11/60* (2013.01); *G06T 3/00* (2013.01); *G06T 7/0081* (2013.01); *G06T 2207/20132* (2013.01); *G06T 2210/22* (2013.01)

(58) Field of Classification Search
None
See application file for complete search history.

(56) References Cited

U.S. PATENT DOCUMENTS 6,298,157 B1 * 10/2001 Wilensky ....................... 382/199
6,697,497 B1 *  2/2004 Jensen et al. .................. 382/100

(Continued)

FOREIGN PATENT DOCUMENTS

EP    1956550 A1    8/2008
JP    2001-126070 A    5/2001

(Continued)

OTHER PUBLICATIONS

The partial translation of Office Action for corresponding Korean Patent Application No. 10-2014-7011206 dated Jun. 11, 2014.

(Continued)

*Primary Examiner* — David H Chu
(74) *Attorney, Agent, or Firm* — Hubbs, Enatsky & Inoue PLLC

(57) ABSTRACT

Provided is an image processing device capable of obtaining a trimming image including a characteristic part of a target image without having a person to select the characteristic part of the target image. A setting unit sets a plurality of trimming candidate areas in a target image. A calculation unit calculates, with respect to each of a plurality of trimming candidate areas, a total value of edge amounts of pixels in the trimming candidate area. A determination unit determines a trimming area from among the plurality of trimming candidate areas, based on the total value of each of the plurality of trimming candidate areas. An obtaining unit obtains an image in the trimming area.

21 Claims, 18 Drawing Sheets

(56) References Cited

U.S. PATENT DOCUMENTS

| | | | |
|---|---|---|---|
| 7,680,339 B2 | 3/2010 | Tojo | |
| 8,005,300 B2 | 8/2011 | Koyama et al. | |
| 8,046,717 B1 | 10/2011 | Goel et al. | |
| 8,619,314 B2* | 12/2013 | Bannai | 358/1.18 |
| 2002/0051088 A1* | 5/2002 | Ikeda et al. | 348/630 |
| 2004/0095477 A1 | 5/2004 | Maki et al. | |
| 2004/0161166 A1* | 8/2004 | Enomoto | 382/296 |
| 2004/0196298 A1 | 10/2004 | Nagahashi et al. | |
| 2005/0047656 A1* | 3/2005 | Luo et al. | 382/167 |
| 2005/0100212 A1* | 5/2005 | Eguchi et al. | 382/164 |
| 2006/0227383 A1* | 10/2006 | Kishida | 358/3.27 |
| 2007/0076979 A1* | 4/2007 | Zhang et al. | 382/282 |
| 2007/0177794 A1* | 8/2007 | Gu | 382/160 |
| 2009/0016608 A1* | 1/2009 | Fujimoto et al. | 382/189 |
| 2009/0122164 A1 | 5/2009 | Maki et al. | |
| 2009/0190830 A1 | 7/2009 | Hasegawa | |
| 2009/0285495 A1* | 11/2009 | Wagner | 382/232 |
| 2010/0202684 A1* | 8/2010 | Mattausch et al. | 382/164 |
| 2010/0290705 A1* | 11/2010 | Nakamura | 382/173 |
| 2010/0329550 A1* | 12/2010 | Cheatle | 382/165 |
| 2012/0059261 A1* | 3/2012 | Suri | 600/440 |
| 2013/0094781 A1* | 4/2013 | Koga et al. | 382/300 |
| 2013/0287265 A1* | 10/2013 | Nepomniachtchi et al. | 382/115 |

FOREIGN PATENT DOCUMENTS

| | | |
|---|---|---|
| JP | 2001-128109 A | 5/2001 |
| JP | 2004-072655 A | 3/2004 |
| JP | 2004-228994 A | 8/2004 |
| JP | 2004-228995 A | 8/2004 |
| JP | 2004-289706 A | 10/2004 |
| JP | 2007-207055 A | 8/2007 |
| JP | 2009-182662 A | 8/2009 |
| JP | 2009-230557 A | 10/2009 |
| JP | 2010-193154 A | 9/2010 |
| KR | 10-2010-0013697 A | 2/2010 |
| KR | 10-2011-0076219 A | 7/2011 |

OTHER PUBLICATIONS

International Search Report for PCT/JP2012/068334 dated Oct. 23, 2012.
English Translation of Written Opinion of the International Searching Authority for PCT/JP2012/068334 accompanied with PCT/IB/373 and PCT/IB/338 dated May 22, 2014 acting as concise explanation of previously submitted reference(s).
The partial translation of Office Action for corresponding Japanese Patent Application No. 2011-245871 dated Feb. 14, 2012.
XP009144529, Vaqueroa et al: "A survey of image retargeting techniques", Proceedings of SPIE, International Society for Optical Engineering, US, vol. 7798, Jan. 1, 2010, pp. 779814-779811.
XP032165313, MA M et al: "Automatic image cropping for mobile device with built-in camera", Consumer Communications and Networking Conference, Las Vegas, NV, USA, Jan. 5, 2004, pp. 710-711.
XP011199941, Gianluigi Ciocca et al: "Self-Adaptive Image Cropping for Small Displays", IEEE Transactions on Consumer Electronics, New York, NY, US, vol. 53, No. 4, Nov. 1, 2007, pp. 1622-1627.
XP055160183, Gianluigi Ciocca et al: "Multiple image thumbnailing", Proceedings of SPIE, vol. 7537, Jan. 18, 2010, pp. 75370S-75370S-9.

* cited by examiner

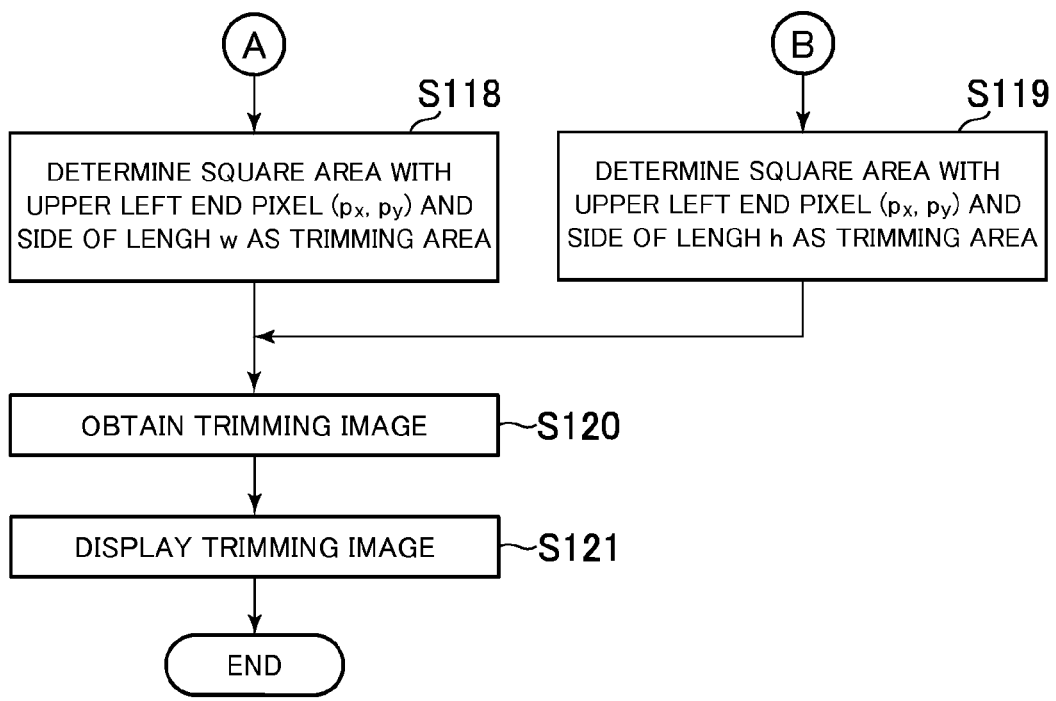
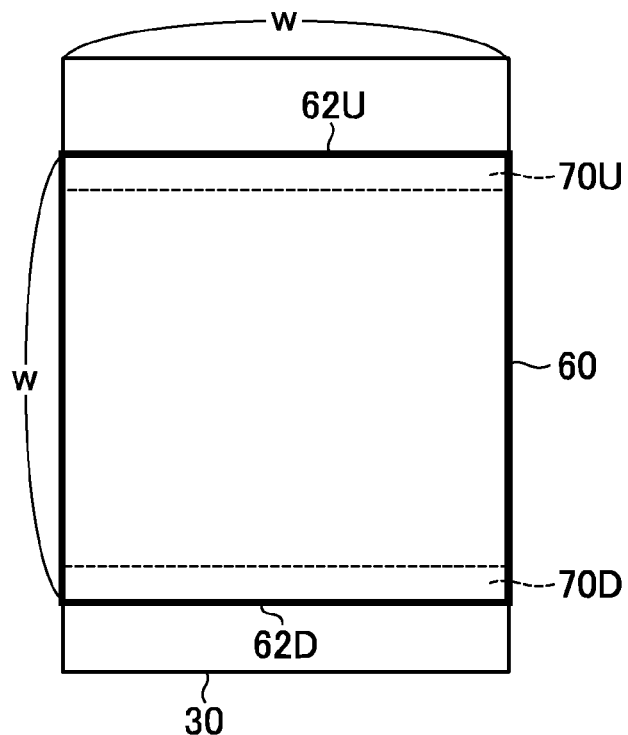

FIG.15

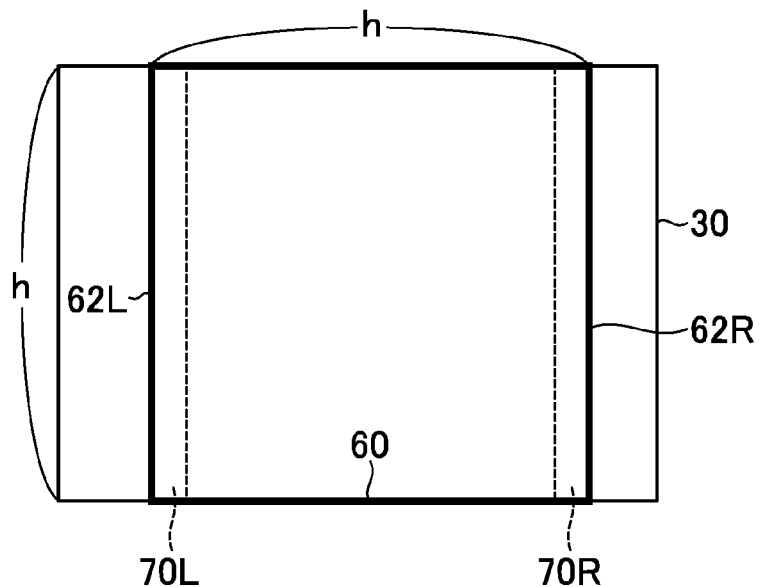

FIG.16

| TRIMMING AREA DETERMINATION PROCESSING | EDGE AMONT | UPPER LEFT END PIXEL ($p_x$, $p_y$) OF TRIMMING AREA |
|---|---|---|
| FIRST TRIMMING AREA DETERMINATION PROCESSING | HUE | EXPRESSIONS (8) AND (9) |
| SECOND TRIMMING AREA DETERMINATION PROCESSING | HUE | EXPRESSIONS (10) AND (11) |
| THIRD TRIMMING AREA DETERMINATION PROCESSING | HUE | EXPRESSIONS (14) AND (15) |
| FOURTH TRIMMING AREA DETERMINATION PROCESSING | HUE | EXPRESSIONS (20) AND (21) |
| FIFTH TRIMMING AREA DETERMINATION PROCESSING | BRIGHTNESS | EXPRESSIONS (8) AND (9) |
| SIXTH TRIMMING AREA DETERMINATION PROCESSING | BRIGHTNESS | EXPRESSIONS (10) AND (11) |
| SEVENTH TRIMMING AREA DETERMINATION PROCESSING | BRIGHTNESS | EXPRESSIONS (14) AND (15) |
| EIGHTH TRIMMING AREA DETERMINATION PROCESSING | BRIGHTNESS | EXPRESSIONS (20) AND (21) |

FIG.19

| DISTRIBUTION PATTERN IFORMATION ON EDGE AMOUNT | TRIMMING AREA DETERMINATION PROCESSING |
|---|---|
| FIRST DISTRIBUTION PATTERN INFORMATION | FIRST TRIMMING AREA DETERMINATION PROCESSING |
| SECOND DISTRIBUTION PATTERN INFORMATION | SECOND TRIMMING AREA DETERMINATION PROCESSING |
| THIRD DISTRIBUTION PATTERN INFORMATION | THIRD TRIMMING AREA DETERMINATION PROCESSING |
| FOURTH DISTRIBUTION PATTERN INFORMATION | FOURTH TRIMMING AREA DETERMINATION PROCESSING |
| FIFTH DISTRIBUTION PATTERN INFORMATION | FIFTH TRIMMING AREA DETERMINATION PROCESSING |
| SIXTH DISTRIBUTION PATTERN INFORMATION | SIXTH TRIMMING AREA DETERMINATION PROCESSING |
| SEVENTH DISTRIBUTION PATTERN INFORMATION | SEVENTH TRIMMING AREA DETERMINATION PROCESSING |
| EIGHTH DISTRIBUTION PATTERN INFORMATION | EIGHTH TRIMMING AREA DETERMINATION PROCESSING |

FIG.20

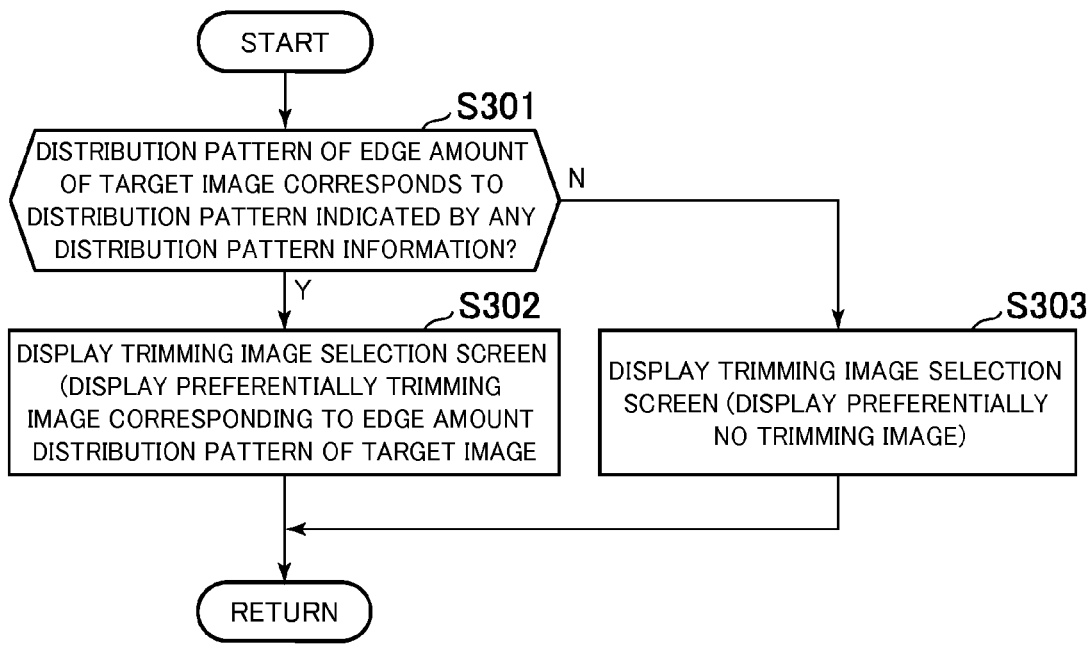

FIG.21

| DISTRIBUTION PATTERN INFORMATION ON EDGE AMOUNT | TRIMMING IMAGE SELECTION RESULT INFORMATION (NUMBER OF SELECTIONS OF TRIMMING IMAGE) | | | | | | | |
|---|---|---|---|---|---|---|---|---|
| | 1 | 2 | 3 | 4 | 5 | 6 | 7 | 8 |
| FIRST DISTRIBUTION PATTERN INFORMATION | 50 | 12 | 8 | 10 | 14 | 2 | 11 | 9 |
| SECOND DISTRIBUTION PATTERN INFORMATION | 5 | 60 | 18 | 20 | 5 | 11 | 17 | 8 |
| THIRD DISTRIBUTION PATTERN INFORMATION | 12 | 20 | 41 | 17 | 15 | 15 | 20 | 13 |
| FORUTH DISTRIBUTION PATTERN INFORMATION | 25 | 10 | 10 | 53 | 10 | 16 | 19 | 20 |
| FIFTH DISTRIBUTION PATTERN INFORMATION | 16 | 21 | 25 | 14 | 61 | 11 | 15 | 21 |
| SIXTH DISTRIBUTION PATTERN INFORMATION | 18 | 12 | 12 | 23 | 22 | 48 | 26 | 19 |
| SEVENTH DISTRIBUTION PATTERN INFORMATION | 13 | 16 | 19 | 27 | 27 | 10 | 22 | 53 |
| EIGHTH DISTRIBUTION PATTERN INFORMATION | 24 | 15 | 18 | 13 | 18 | 26 | 47 | 27 |

FIG.22

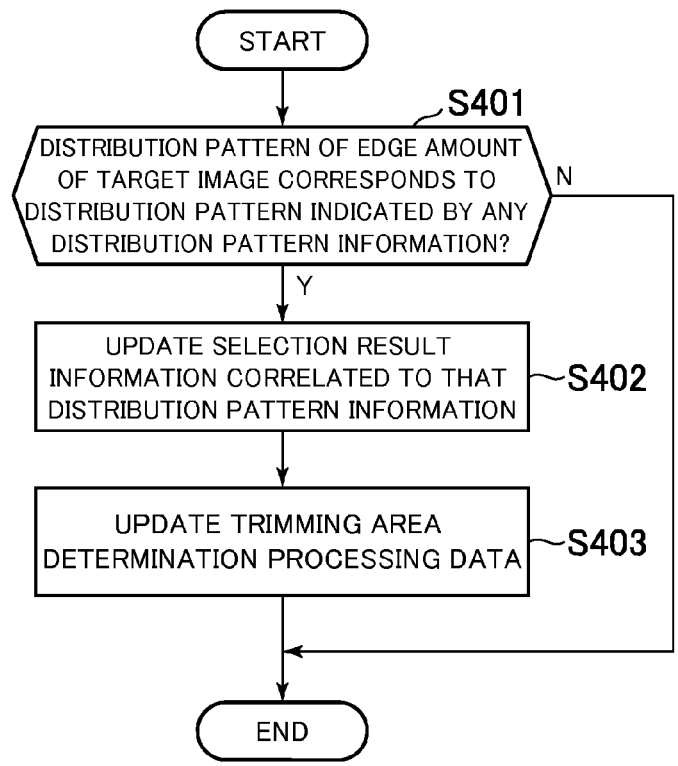

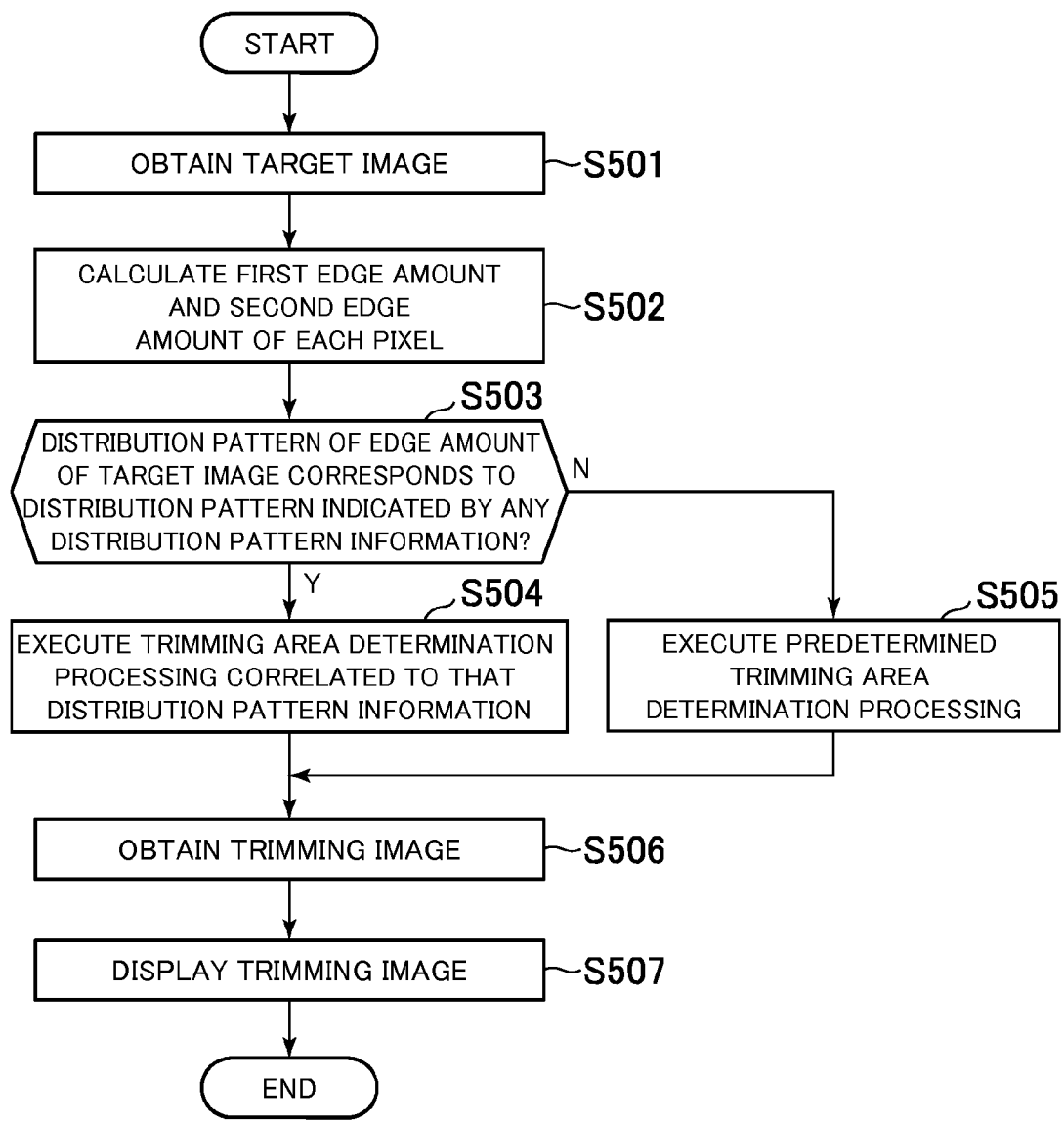

IMAGE PROCESSING DEVICE, METHOD FOR CONTROLLING IMAGE PROCESSING DEVICE, PROGRAM, AND INFORMATION STORAGE MEDIUM

CROSS REFERENCE TO RELATED APPLICATIONS

This application is a National Stage of International Application No. PCT/JP2012/068334 filed Jul. 19, 2012, claiming priority based on Japanese Patent Application No. 2011-245871 filed on Nov. 9, 2011. The contents of each of the above documents are incorporated herein by reference in their entirety.

TECHNICAL FIELD

The present invention relates to an image processing device, a method for controlling an image processing device, a program, and an information storage medium.

BACKGROUND ART

There has been known a web service employing an interface for displaying a plurality of images aligned. For example, there have been known a service for disclosing a cooking image contributed by a user together with its recipe, a service for disclosing an automobile image contributed by a user, and the like.

In displaying a plurality of images aligned in the above described service, a thumbnail image that is generated by trimming a part of an original image is often used. Conventionally, such a thumbnail image is often generated manually. In recent years, however, an increasing number of web services involving a large amount of such images come to be available, and accordingly, a technique for efficiently generating a large amount of thumbnail images is strongly desired.

As such a technique, there has been known a technique for automatically generating a thumbnail image from an image by trimming at a predetermined fixed position, for example.

Patent Literature 1, for example, discloses trimming so as to generate a trimming image showing a key object that is selected by a user and that is positioned at the center.

CITATION LIST

Patent Literature

Patent Literature 1: JP 2004-289706 A

SUMMARY OF INVENTION

Technical Problem

In generation of a thumbnail image from an image, it is desirable that the thumbnail image includes a characteristic part of the original image. However, in generation the thumbnail image from the image by trimming at a predetermined fixed position, trimming is made at the predetermined fixed position irrespective of the content of the original image. Therefore, the characteristic part of the original image may not be included in the resultant thumbnail image, a desirable thumbnail image cannot be provided. Further, according to the technique described in Patent Literature 1, although it is possible to obtain a trimming image showing a key object positioned at the center thereof, the technique described in Patent Literature 1 requires a person to select the key object.

The present invention has been conceived in view of the above, and aims to provide an image processing device, a method for controlling an image processing device, a program, and an information storage medium capable of obtaining a trimming image including a characteristic part of a target image, without having a person to select the characteristic part of the target image.

Solution to Problem

In order to achieve the above described object, an image processing device according to the present invention is an image processing device comprising: setting means for setting a plurality of trimming candidate areas in a target image; calculation means for calculating, with respect to each of the plurality of trimming candidate areas, a total value of edge amounts of pixels in the trimming candidate area; determination means for determining a trimming area from among the plurality of trimming candidate areas, based on the total value of each of the plurality of trimming candidate areas; and obtaining means for obtaining an image in the trimming area.

A method for controlling an image processing device according to the present invention is a method for controlling an image processing device, the method comprising: a setting step of setting a plurality of trimming candidate areas in a target image; a calculation step of calculating, with respect to each of the plurality of trimming candidate areas, a total value of edge amounts of pixels in the trimming candidate area; a determination step of determining a trimming area from among the plurality of trimming candidate areas, based on the total value of each of the plurality of trimming candidate areas; and an obtaining step of obtaining an image in the trimming area.

A program according to the present invention is a program for causing a computer to function as: setting means for setting a plurality of trimming candidate areas in a target image; calculation means for calculating, with respect to each of the plurality of trimming candidate areas, a total value of edge amounts of pixels in the trimming candidate area; determination means for determining a trimming area from among the plurality of trimming candidate areas, based on the total value of each of the plurality of trimming candidate areas; and obtaining means for obtaining an image in the trimming area.

An information storage medium according to the present invention is a computer readable information storage medium storing a program for causing a computer to function as: setting means for setting a plurality of trimming candidate areas in a target image; calculation means for calculating, with respect to each of the plurality of trimming candidate areas, a total value of edge amounts of pixels in the trimming candidate area; determination means for determining a trimming area from among the plurality of trimming candidate areas, based on the total value of each of the plurality of trimming candidate areas; and obtaining means for obtaining an image in the trimming area.

According to one aspect of the present invention, the determination means may comprise means for determining a trimming candidate area of which the total value is a maximum among the plurality of trimming candidate areas as the trimming area.

According to one aspect of the present invention, the image processing device may further comprises second calculation means for calculating, with respect to each of the plurality of trimming candidate areas, a divided value or an inverted value thereof, the divided value being obtained by dividing the total value of the trimming candidate area by the total value of edge amounts of pixels in at least one boundary part of the trimming candidate area, and the determination means may determine the trimming area from among the plurality of trimming candidate areas, based on the divided value or the inverted value of each of the plurality of trimming candidate areas.

According to one aspect of the present invention, the determination means may comprise means for determining a trimming candidate area of which the divided value is a maximum or a trimming candidate area of which the inverted value is a minimum among the plurality of trimming candidate areas as the trimming area.

According to one aspect of the present invention, the image processing device may further comprise means for calculating, with respect to each of the plurality of trimming candidate areas, a total value of edge amounts of pixels in a first boundary part of the trimming candidate area as a first total value; and means for calculating, with respect to each of the plurality of trimming candidate areas, a total value of edge amounts of pixels in a second boundary part of the trimming candidate area as a second total value, the second boundary part being opposite to the first boundary part, and the second calculation means may calculate, with respect to each of the plurality of trimming candidate areas, a divided value or an inverted value thereof, the divided value being obtained by dividing the total value of the trimming candidate area by larger one of the first total value and the second total value of the trimming candidate area.

According to one aspect of the present invention, the calculation means may calculate a weighted total value of the edge amounts of the pixels in the trimming candidate area as the total value of the edge amounts of the pixels in the trimming candidate area, and the calculation means may set a higher weight for an edge amount of a pixel in a middle part of the trimming candidate area than a weight for an edge amount of a pixel in a boundary part of the trimming candidate area.

According to one aspect of the present invention, the edge amount may be an amount relevant to a difference in brightness between a pixel and a pixel around the pixel.

According to one aspect of the present invention, the edge amount may be an amount relevant to a difference in hue between a pixel and a pixel around the pixel.

According to one aspect of the present invention, the image processing device may further comprise means for removing a part including an end part of the image in the trimming area and including no pixel of which an edge amount is equal to or larger than a reference amount.

According to one aspect of the present invention, the image processing device may further comprise means for storing correlation data for correlating distribution pattern information to each of a plurality of kinds of trimming area determination processings for determining the trimming area from among the plurality of trimming candidate areas, the distribution pattern information being information on a distribution pattern of an edge amount of an image, and the determination means may determine the trimming area from among the plurality of trimming candidate areas, based on the total value of each of the plurality of trimming candidate areas, through trimming area determination processing correlated to a distribution pattern of an edge amount of the target image.

According to one aspect of the present invention, the determination means may comprise means for determining a plurality of trimming areas corresponding to the plurality of kinds of trimming area determination processings by determining the trimming area from among the plurality of trimming candidate areas based on the total value of each of the plurality of trimming candidate areas, through each of the plurality of kinds of trimming area determination processings, and the image processing device may further comprise display control means for displaying images in the plurality of trimming areas on a display means; receiving means for receiving at least one image selected by a user among the images in the plurality of trimming areas; and update means for updating the correlation data, based on a result of selection by the user.

According to one aspect of the present invention, the image processing device may further comprise means for storing correlation data for correlating distribution pattern information to each of a plurality of kinds of trimming area determination processings for determining the trimming area from among the plurality of trimming candidate areas, the distribution pattern information being information on a distribution pattern of an edge amount of an image, the determination means may comprise means for determining a plurality of trimming areas corresponding to the plurality of kinds of trimming area determination processings by determining the trimming area from among the plurality of trimming candidate areas based on the total value of each of the plurality of trimming candidate areas, through each of the plurality of kinds of trimming area determination processings, the image processing device may further comprise display control means for displaying images in the plurality of trimming areas on display means; and receiving means for receiving at least one image selected by a user among the images in the plurality of trimming areas, and the display control means may display preferentially or distinctively an image in a trimming area corresponding to trimming area determination processing correlated to a distribution pattern of an edge amount of the target image, among the images in the plurality of trimming areas.

According to one aspect of the present invention may further comprise update means for updating the correlation data, based on a result of selection by the user.

According to one aspect of the present invention, the plurality of kinds of trimming area determination processings may include trimming area determination processing for determining a trimming candidate area of which the total value is a maximum among the plurality of trimming candidate areas as the trimming area, and trimming area determination processing for determining a trimming candidate area of which a divided value is a maximum among the plurality of trimming candidate areas as the trimming area, the divided value being obtained by dividing the total value by a total value of edge amounts of pixels in at least one boundary part of the trimming candidate area.

According to one aspect of the present invention, the calculation means may comprise first calculation means for calculating, with respect to each of the plurality of trimming candidate areas, a total value of first edge amounts of pixels in the trimming candidate area as a first total value, and second calculation means for calculating, with respect to each of the plurality of trimming candidate areas, a total value of second edge amounts of pixels in the trimming candidate area as a second total value, the first edge amount may be an amount relevant to a difference in hue between a pixel and a pixel around the pixel, the second edge amount may be an amount relevant to a difference in brightness between a pixel and a pixel around the pixel, and the plurality of kinds of trimming area determination processings may include trimming area determination processing for determining a trimming area from among the plurality of trimming candidate areas based on the first total value of each of the plurality of trimming candidate areas, and trimming area determination processing for determining a trimming area from among the plurality of trimming candidate areas based on the second total value of each of the plurality of trimming candidate areas.

According to one aspect of the present invention, the setting means may set a partial area in the target image as a trimming candidate area, and may move the trimming candidate area vertically and/or horizontally in the target image to thereby set the plurality of trimming candidate areas.

Advantageous Effects of Invention

According to the present invention, it is possible to obtain a trimming image including a characteristic part of a target image, without having a person to select the characteristic part of the target image.

BRIEF DESCRIPTION OF DRAWINGS

FIG. 13 is a flowchart showing one example of processing executed in the image processing device;
FIG. 14 explains a boundary part of the trimming candidate area;
FIG. 15 explains the boundary part of the trimming candidate area;
FIG. 16 explains a plurality of kinds of trimming area determination processings;
FIG. 19 shows one example of trimming area determination processing data;
FIG. 20 is a flowchart showing another example of processing executed in the image processing device;
FIG. 21 shows one example of selection result data;
FIG. 22 is a flowchart showing another example of processing executed in the image processing device;
FIG. 23 is a flowchart showing another example of processing executed in the image processing device.

DESCRIPTION OF EMBODIMENTS

In the following, examples of embodiments of the present invention will be described in detail, based on the drawings.

First Embodiment

Figure 1:
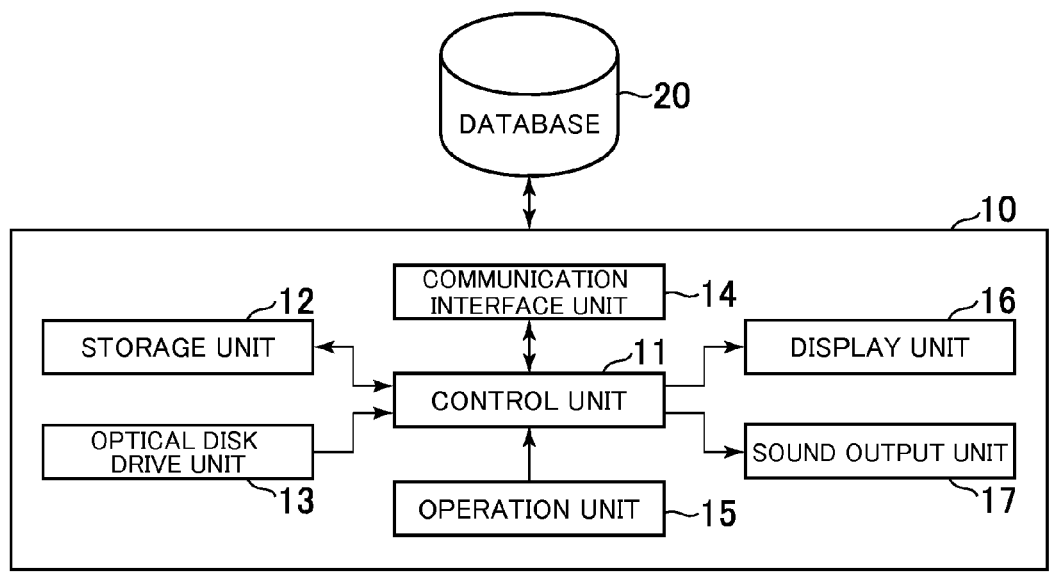
FIG. 1 shows one example of a hardware structure of an image processing device according to an embodiment of the present invention.

Initially, a first embodiment of the present invention will be described. An image processing device according to the first embodiment of the present invention is implemented using, for example, a desk top computer, a lap top computer, a tablet computer, a server computer, or the like. FIG. 1 shows one example of a hardware structure of an image processing device 10 according to the first embodiment.

As shown in FIG. 1, the image processing device 10 includes a control unit 11, a storage unit 12, an optical disk drive unit 13, a communication interface unit 14, an operation unit 15, a display unit 16, and a sound output unit 17.

The control unit 11 includes one or more microprocessors, for example, and executes information processing according to an operating system or a program stored in the storage unit 12. The storage unit 12 includes a RAM, a hard disk, or a solid state drive, for example. The optical disk drive unit 13 reads a program and data stored in an optical disk (an information storage medium).

A program and data is supplied to the storage unit 12 via an optical disk. That is, an optical disk storing a program and data is mounted in the optical disk drive unit 13, and the program and data is read from the optical disk by the optical disk drive unit 13, and stored in the storage unit 12. The optical disk drive unit 13 is not an essential structural element. A structural element for reading a program or data stored in an information storage medium other than an optical disk (for example, a memory card) may be included instead of the optical disk drive unit 13, so that a program and data may be supplied to the storage unit 12 via an information storage medium other than an optical disk.

The communication interface unit 14 is an interface for connecting the image processing device 10 to a communication network. The image processing device 10 can exchange data with other devices (for example, a server or the like) via a communication network. A program and data may be supplied to the storage unit 12 via a communication network.

The operation unit 15 is used by a user for operation. For example, a keyboard, a touch pad, a mouse, a touch panel, a stick (a lever), or the like, corresponds to the operation unit 15. The display unit 16 is, for example, a liquid crystal display or the like, and the sound output unit 17 is, for example, a speaker, a headphone terminal, or the like.

The image processing device 10 can access a database 20. The database 20 may be implemented in a device (for example, a server) other than the image processing device 10 or in the image processing device 10.

An image is stored in the database 20. For example, an image disclosed by a service provided by a web server (not shown) is stored in the database 20. For example, when a service for disclosing a cooking image contributed by a contributor is provided, the cooking image contributed by the contributor is stored in the database 20. For example, when a service for disclosing an automobile image contributed by a contributor is provided, the automobile image contributed by the contributor is stored in the database 20.

Figure 2:
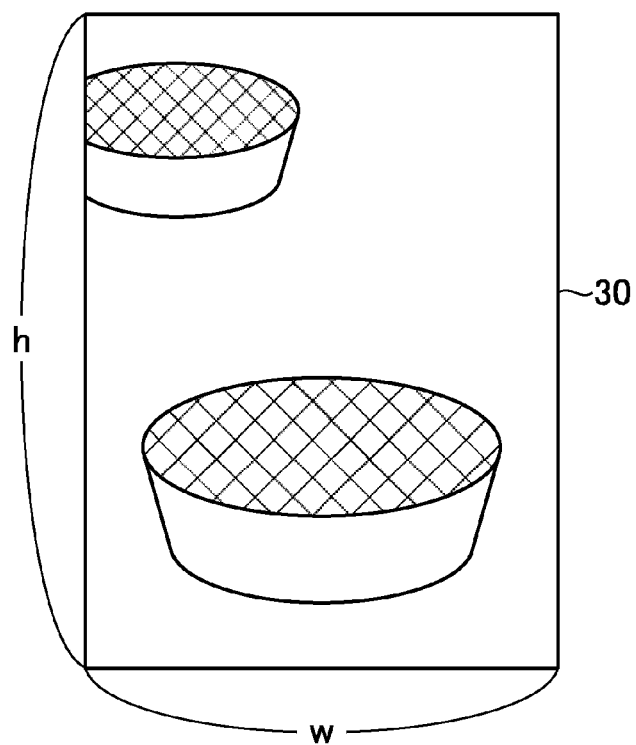
FIG. 2 shows one example of a cooking image.
Figure 3:
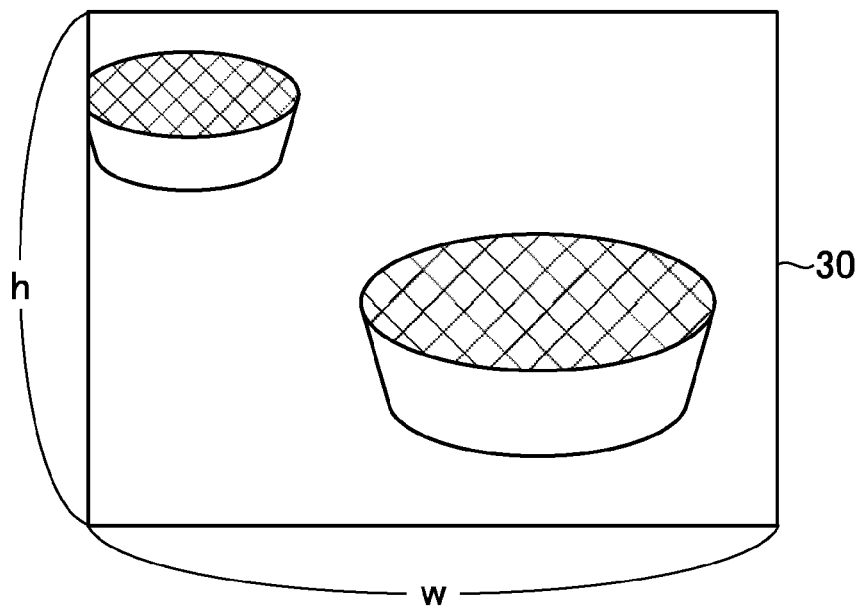
FIG. 3 shows another example of the cooking image.

In the following, description is made based on an assumption that a cooking image contributed by a contributor is stored in the database 20. FIGS. 2 and 3 show an example of the cooking image stored in the database 20. The cooking image 30 shown in FIG. 2 is a vertically long image having a vertical side of a length (the number of pixels) longer than the length (the number of pixels) of a horizontal side thereof. Meanwhile, the cooking image 30 shown in FIG. 3 is a horizontally long image having a horizontal side of a length longer than the length of a vertical side thereof.

In the following, a technique for generating a trimming image (a thumbnail image) of the cooking image 30 contributed by the contributor by trimming (cutting out) a part of the cooking image 30 will be described. In particular, a technique for generating a trimming image including a characteristic part of the cooking image 30 without having a person to select the characteristic part of the cooking image 30 will be described below.

Figure 4:
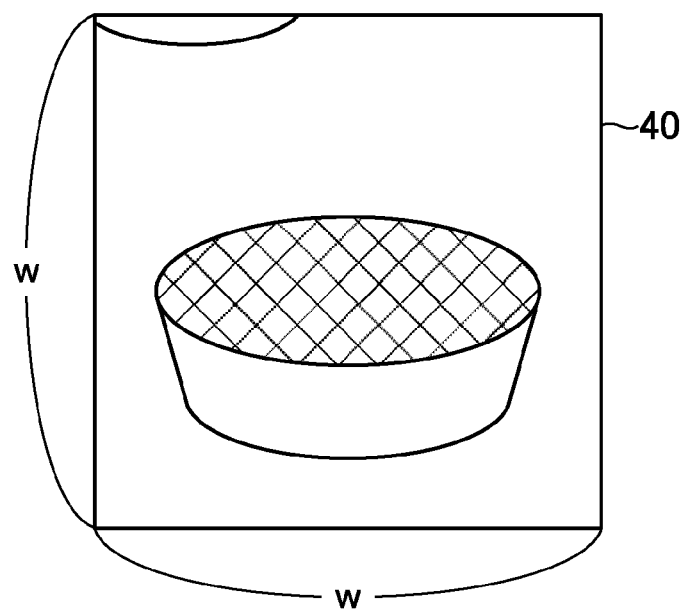
FIG. 4 shows one example of a trimming image.
Figure 5:
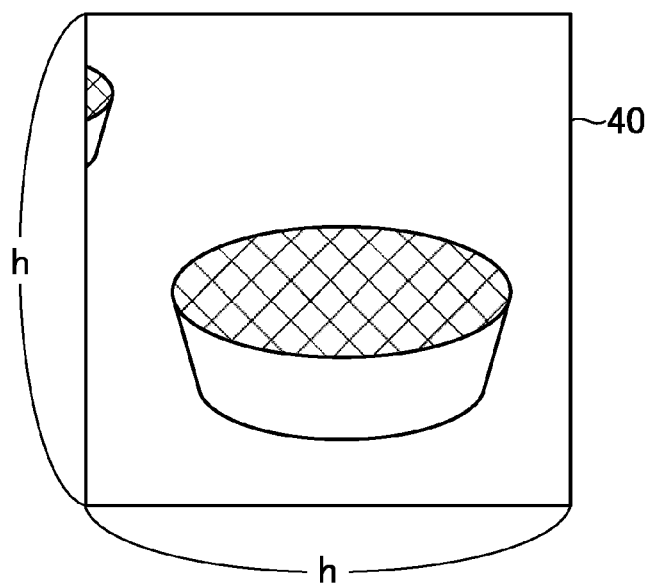
FIG. 5 shows another example of the trimming image.

Below, a case will be described in which a square trimming image having a side of a length equal to the length of the shorter side of the cooking image is generated from the cooking image 30. FIG. 4 shows one example of a trimming image of the cooking image 30 shown in FIG. 2, and FIG. 5 shows one example of a trimming image of the cooking image 30 shown in FIG. 3. The length of each side of the trimming image 40 shown in FIG. 4 is equal to the length (w) of the horizontal side of the cooking image 30 shown in FIG. 2. Meanwhile, the length of each side of the trimming image 40 shown in FIG. 5 is equal to the length (h) of the vertical side of the cooking image 30 shown in FIG. 3.

Figure 6:
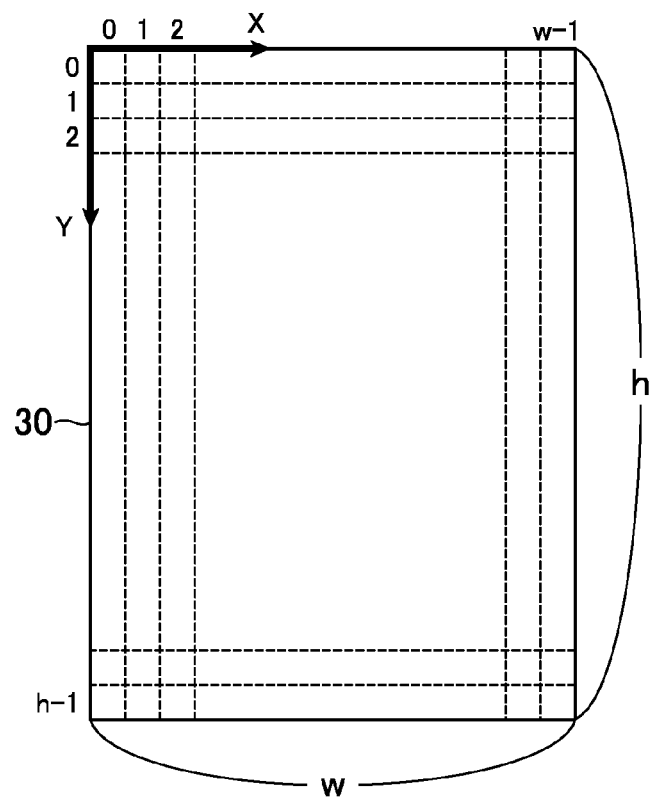
FIG. 6 explains a pixel of the cooking image.

Below, as shown in FIG. 6, each pixel of the cooking image 30 is expressed as (x, y) according to a coordinate system having the upper left end pixel of the cooking image 30 as the origin, the rightward direction as the X axial positive direction, and the downward direction as the Y axial positive direction. For example, the upper left end pixel of the cooking image 30 is expressed as (0, 0) and the upper right end pixel as (w−1, 0). Further, for example, the lower left end pixel of the cooking image 30 is expressed as (0, h−1), and the lower right end pixel as (w−1, h−1).

Figure 7:
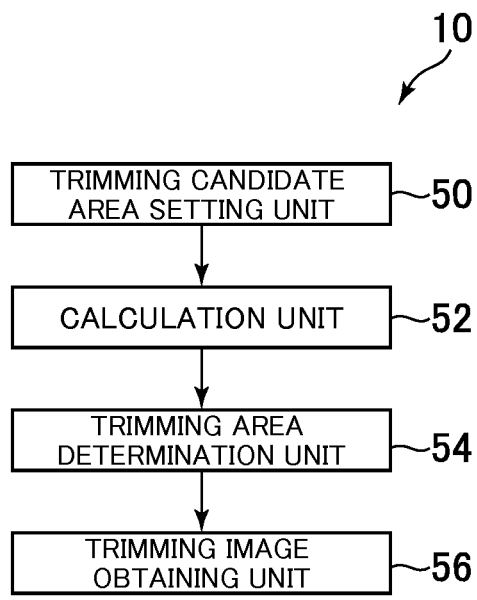
FIG. 7 is a function block diagram of the image processing device.

FIG. 7 is a function block diagram showing function blocks relevant to the present invention among those achieved in the image processing device 10 according to the first embodiment. As shown in FIG. 7, the image processing device 10 includes a trimming candidate area setting unit 50, a calculation unit 52, a trimming area determination unit 54, and a trimming image obtaining unit 56.

The trimming candidate area setting unit 50 sets a plurality of trimming candidate areas in a target image. The "target image" refers to an image that is a target of trimming processing. The cooking image 30 contributed by the contributor corresponds to the "target image" in this embodiment.

FIGS. 8 and 9 explain a trimming candidate area. The size of a trimming candidate area 60 is set equal to that of the trimming image 40 to be generated. For example, in the case of generating a square image having a side of a length equal to the length of the shorter side of the cooking image 30 (the target image) as the trimming image 40 of the cooking image 30, the trimming candidate area 60 is set as a square area having a side of a length equal to the length of the shorter side of the cooking image 30.

For example, if the cooking image 30 is a vertically long image, as shown in FIG. 8, the trimming candidate area 60 is a square area having a side of a length equal to the length (w) of the horizontal side of the cooking image 30. Meanwhile, if the cooking image 30 is a horizontally long image, as shown in FIG. 9, the trimming candidate area 60 is a square area having a side of a length equal to the length (h) of the vertical side of the cooking image 30.

The trimming candidate area setting unit 50 sets a plurality of trimming candidate areas 60 by setting a partial area within the cooking image 30 as a trimming candidate area 60, and by moving the trimming candidate area 60 vertically and/or horizontally in the cooking image 30.

Figure 8A:
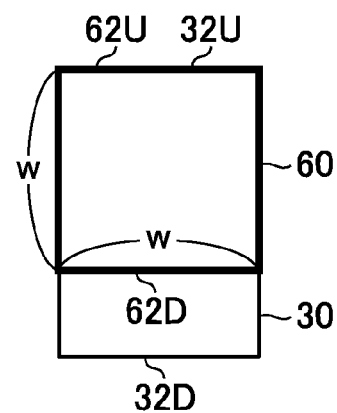
FIG. 8A explains a trimming candidate area.

For example, if the cooking image 30 is a vertically long image, as shown in FIG. 8, the trimming candidate area setting unit 50 sets the initial position of the trimming candidate area 60 such that the upper left end pixel of the trimming candidate area 60 coincides with the upper left end pixel of the cooking image 30 (see FIG. 8(A)). In other words, the trimming candidate area setting unit 50 sets the initial position of the trimming candidate area 60 such that the upper boundary 62U of the trimming candidate area 60 coincides with the upper side 32U of the cooking image 30.

Figure 8B:
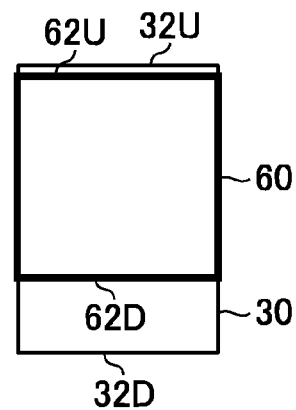
FIG. 8B explains the trimming candidate area.
Figure 8C:
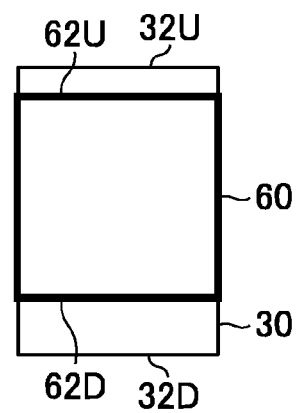
FIG. 8C explains the trimming candidate area.
Figure 8D:
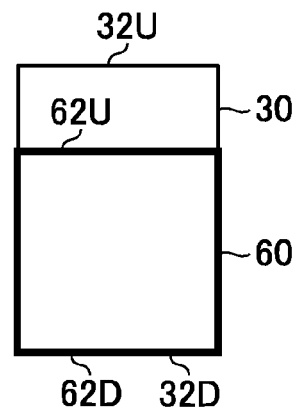
FIG. 8D explains the trimming candidate area.

Then, the trimming candidate area setting unit 50 moves the trimming candidate area 60 downward by one pixel within the cooking image 30 (see FIG. 8(B)). Then, the trimming candidate area setting unit 50 further moves the trimming candidate area 60 downward by one pixel within the cooking image 30 (see FIG. 8(C)). In the above described manner, the trimming candidate area setting unit 50 keeps moving the trimming candidate area 60 downward by one pixel within the cooking image 30 until the lower boundary 62D of the trimming candidate area 60 falls on the lower side 32D of the cooking image 30 (see FIG. 8(D)). When the lower boundary 62D of the trimming candidate area 60 falls on the lower side 32D of the cooking image 30, the upper left end pixel of the trimming candidate area 60 coincides with the pixel (0, h−w−1) of the cooking image 30.

Alternatively, the trimming candidate area setting unit 50 may set the initial position of the trimming candidate area 60 such that the lower left end pixel of the trimming candidate area 60 coincides with the lower left end pixel of the cooking image 30. In other words, the trimming candidate area setting unit 50 may set the initial position of the trimming candidate area 60 such that the lower boundary 62D of the trimming candidate area 60 coincides with the lower side 32D of the cooking image 30. Then the trimming candidate area setting unit 50 may keep moving the trimming candidate area 60 upward by one pixel within the cooking image 30 until the upper boundary 62U of the trimming candidate area 60 falls on the upper side 32U of the cooking image 30.

Figure 9A:
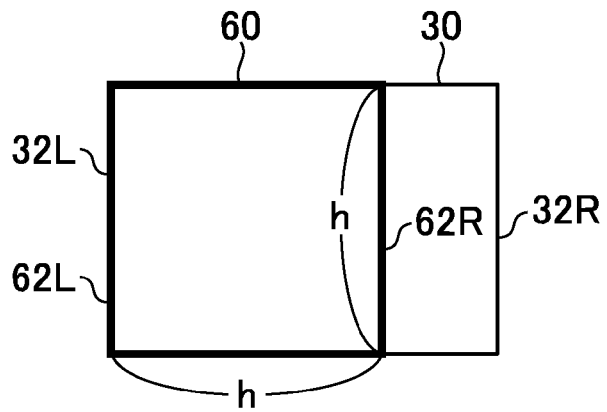
FIG. 9A explains the trimming candidate area.

Meanwhile, if the cooking image 30 is a horizontally long image, as shown in FIG. 9, the trimming candidate area setting unit 50 sets the initial position of the trimming candidate area 60 such that the upper left end pixel of the trimming candidate area 60 coincides with the upper left end pixel of the cooking image 30 (see FIG. 9(A)). In other words, the trimming candidate area setting unit 50 sets the initial position of the trimming candidate area 60 such that the left boundary 62L of the trimming candidate area 60 coincides with the left side 32L of the cooking image 30.

Figure 9B:
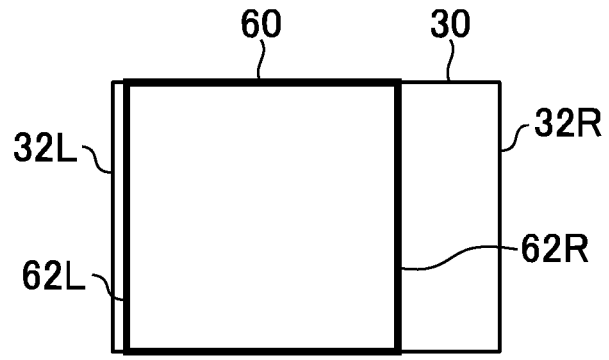
FIG. 9B explains the trimming candidate area.
Figure 9C:
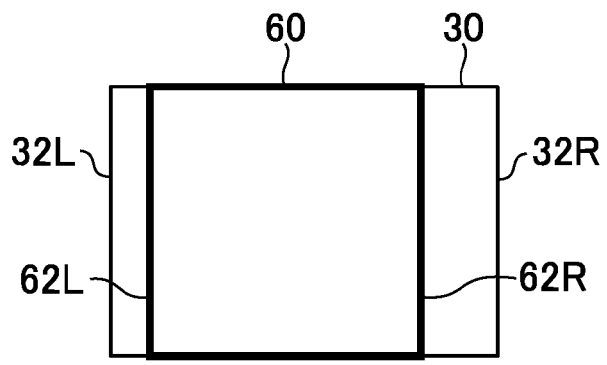
FIG. 9C explains the trimming candidate area.
Figure 9D:
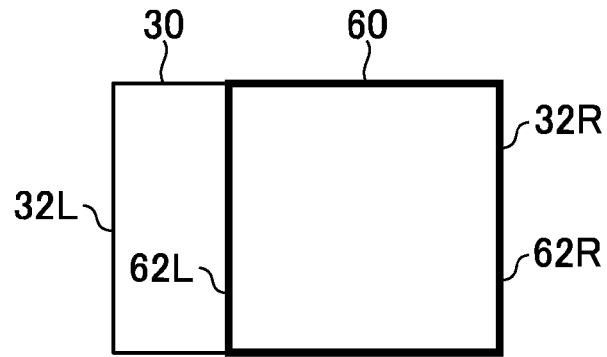
FIG. 9D explains the trimming candidate area.

Then, the trimming candidate area setting unit 50 moves the trimming candidate area 60 rightward by one pixel within the cooking image 30 (see FIG. 9(B)). Then, the trimming candidate area setting unit 50 further moves the trimming candidate area 60 rightward by one pixel within the cooking image 30 (see FIG. 9(C)). In the above described manner, the trimming candidate area setting unit 50 keeps moving the trimming candidate area 60 rightward by one pixel within the cooking image 30 until the right boundary 62R of the trimming candidate area 60 falls on the right side 32R of the cooking image 30 (see FIG. 9(D)). When the right boundary 62R of the trimming candidate area 60 falls on the right side 32R of the cooking image 30, the upper left end pixel of the trimming candidate area 60 coincides with the pixel (w−h−1, 0) of the cooking image 30.

Alternatively, the trimming candidate area setting unit 50 may set the initial position of the trimming candidate area 60 such that the upper right end pixel of the trimming candidate area 60 coincides with the upper right end pixel of the cooking image 30. In other words, the trimming candidate area setting unit 50 may set the initial position of the trimming candidate area 60 such that the right boundary 62R of the trimming candidate area 60 coincides with the right side 32R of the cooking image 30. Then, the trimming candidate area setting unit 50 may keep moving the trimming candidate area 60 leftward by one pixel within the cooking image 30 until the left boundary 62L of the trimming candidate area 60 falls on the left side 32L of the cooking image 30.

The calculation unit 52 calculates, with respect to each of the plurality of trimming candidate areas 60, a total value of edge amounts of pixels in the trimming candidate area 60. The "edge" refers to an extent of change in the color in the target image. The "edge amount of a pixel" refers to an amount relevant to a difference in the hue (color phase) between a pixel and a pixel around that pixel.

A publicly known method can be used as a method for calculating the edge amount of a pixel. For example, Sobel filter can be used. Assuming that the pixel value of a pixel (x, y) is $I_{x,y}$, the edge amount $S_{x,y}$ of the pixel (x, y) is calculated by the below-mentioned expressions (1) to (3).

[Expression 1]

$$S_{x,y\ horz.} = \sum_{i \in \{-1,0,1\}} (I_{x+1,y+i} - I_{x-1,y+i}) \quad (1)$$

$$S_{x,y\ vert.} = \sum_{i \in \{-1,0,1\}} (I_{x+i,y+1} + I_{x+i,y-1}) \quad (2)$$

$$S_{x,y} = \sqrt{S_{x,y\ horz.}^2 + S_{x,y\ vert.}^2} \quad (3)$$

The pixel value I of each pixel is obtained by converting the RGB value of the pixel into a $YC_BC_R$ value. Conversion from an RGB value to a $YC_BC_R$ value is made by the below-mentioned expression (4). As an amount relevant to a difference in the hue between a pixel and a pixel around that pixel is used as the "edge amount of the pixel" here, the pixel value I of each pixel is calculated based on the $C_B$, $C_R$ values of the pixel. For example, the pixel value I of each pixel is calculated by the below-mentioned expression (5).

[Expression 2]

$$\begin{bmatrix} Y \\ C_B \\ C_R \\ 1 \end{bmatrix} = \begin{bmatrix} 65.481 & 128.553 & 24.966 & 16 \\ -37.797 & -74.203 & 112 & 128 \\ 112 & -93.786 & -18.214 & 128 \\ 0 & 0 & 0 & 1 \end{bmatrix} \quad (4)$$

$$I = \sqrt{C_B^2 + C_R^2} \quad (5)$$

Based on the edge amount S of each pixel of the cooking image 30 (the target image) calculated as described above, the calculation unit 52 calculates the total value T of the edge amounts S of the pixels in the trimming candidate area 60. For example, if the cooking image 30 is a vertically long image, assuming that the upper left end pixel of the trimming candidate area 60 is at (0, i), the total value T is calculated by the below-mentioned expression (6). Meanwhile, if the cooking image 30 is a horizontally long image, assuming that the upper left end pixel of the trimming candidate area 60 is at (i, 0), the total value T is calculated by the below-mentioned expression (7).

[Expression 3]

$$T = \sum_{Y=i}^{i+w-1} \sum_{X=0}^{w-1} S_{X,Y} \quad (6)$$

$$T = \sum_{Y=0}^{h-1} \sum_{X=i}^{i+h-1} S_{X,Y} \quad (7)$$

The trimming area determination unit 54 determines a trimming area from among a plurality of trimming candidate areas 60, based on the total value T of each of the plurality of trimming candidate areas 60.

Figure 10:
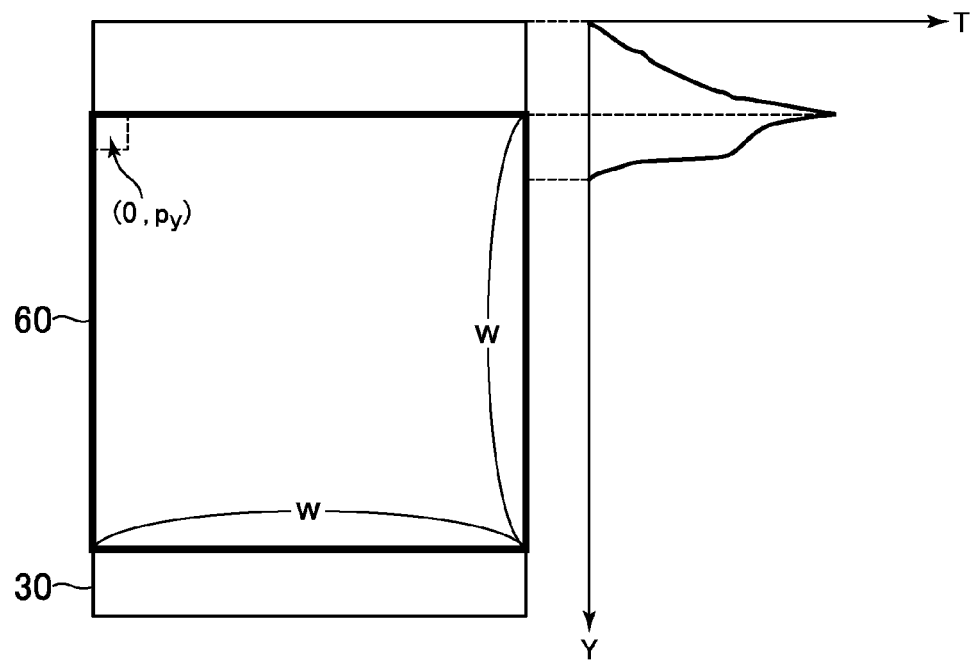
FIG. 10 explains a trimming area determination unit.
Figure 11:
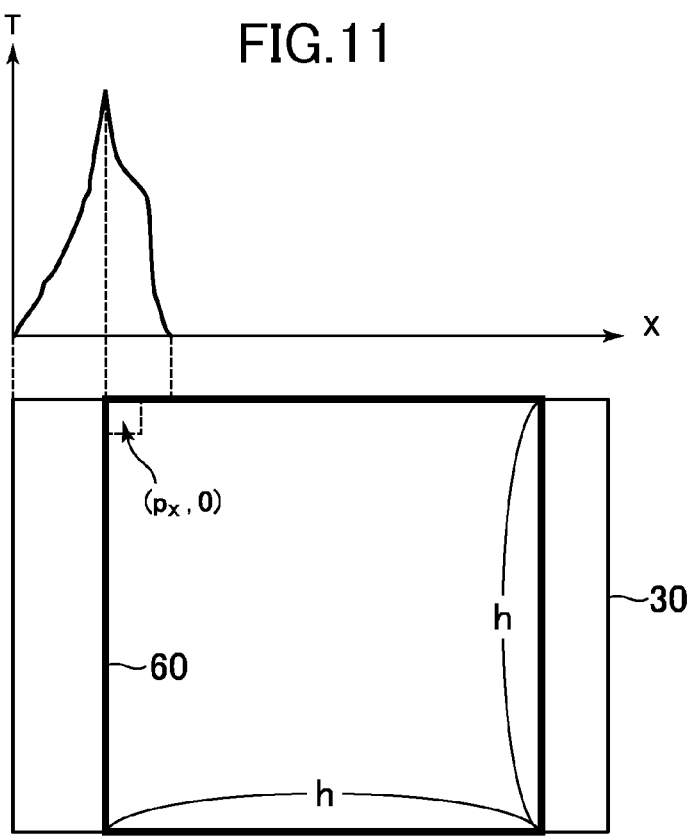
FIG. 11 explains the trimming area determination unit.

For example, the trimming area determination unit 54 determines a trimming candidate area 60 having the maximum total value T among the plurality of trimming candidate areas 60 as the trimming area. FIGS. 10 and 11 explain the trimming area determination unit 54. In FIGS. 10 and 11, the total value T of each trimming candidate area 60 is shown so as to be correlated to the position of the trimming candidate area 60.

FIG. 10 shows a case of the cooking image 30 (the target image) being a vertically long image, in which the total value T of each trimming candidate area 60 is correlated to the Y axial coordinate of the upper left end pixel of the trimming candidate area 60. That is, in FIG. 10, the total value T correlated to the Y axial coordinate (y) indicates the total value T of the edge amounts of the pixels in the trimming candidate area 60 having an upper left end pixel at (0, y).

In the example shown in FIG. 10, the total value T correlated to the Y axial coordinate ($p_y$) is the maximum. In this case, the trimming area determination unit 54 determines the trimming candidate area 60 having an upper left end pixel at (0, $p_y$) as the trimming area. That is, the trimming area determination unit 54 determines a square area having an upper left end pixel at (0, $p_y$) and a side of a length "w" as the trimming area.

FIG. 11 shows a case of the cooking image 30 (the target image) being a horizontally long image, in which the total value T of each trimming candidate area 60 is correlated to the X axial coordinate of the upper left end pixel of the trimming candidate area 60. That is, in FIG. 11, the total value T correlated to the X axial coordinate (x) indicates the total value T of the edge amounts of the pixels in the trimming candidate area 60 having an upper left end pixel at (x, 0).

In the example shown in FIG. 11, the total value T correlated to the X axial coordinate ($p_x$) is the maximum. In this case, the trimming area determination unit 54 determines the trimming candidate area 60 having an upper left end pixel at ($p_x$, 0) as the trimming area. That is, the trimming area determination unit 54 determines a square area having an upper left end pixel at ($p_x$, 0) and a side of a length "h" as the trimming area.

To summarize, the trimming area determination unit 54 determines a square area having an upper left end pixel being a pixel ($p_x$, $p_y$) expressed by the below-mentioned expressions (8) and (9) and a side of a length min{w, h} as the trimming area.

[Expression 4]

$$p_x = \begin{cases} \underset{i}{\operatorname{argmax}} \sum_{Y=0}^{h-1} \sum_{X=i}^{i+h-1} S_{X,Y} & \text{if } w > h \\ 0 & \text{otherwise} \end{cases} \quad (8)$$

$$p_y = \begin{cases} \underset{i}{\operatorname{argmax}} \sum_{Y=i}^{i+w-1} \sum_{X=0}^{w-1} S_{X,Y} & \text{if } w < h \\ 0 & \text{otherwise} \end{cases} \quad (9)$$

The trimming image obtaining unit 56 obtains a trimming image 40. A trimming image 40 is an image shown in a trimming area in the target image (the cooking image 30). That is, the trimming image obtaining unit 56 cuts out an image shown in a trimming area from the cooking image 30 to thereby obtain the trimming image 40, and stores the trimming image 40 in the database 20 so as to be correlated to the cooking image 30.

Figure 12:
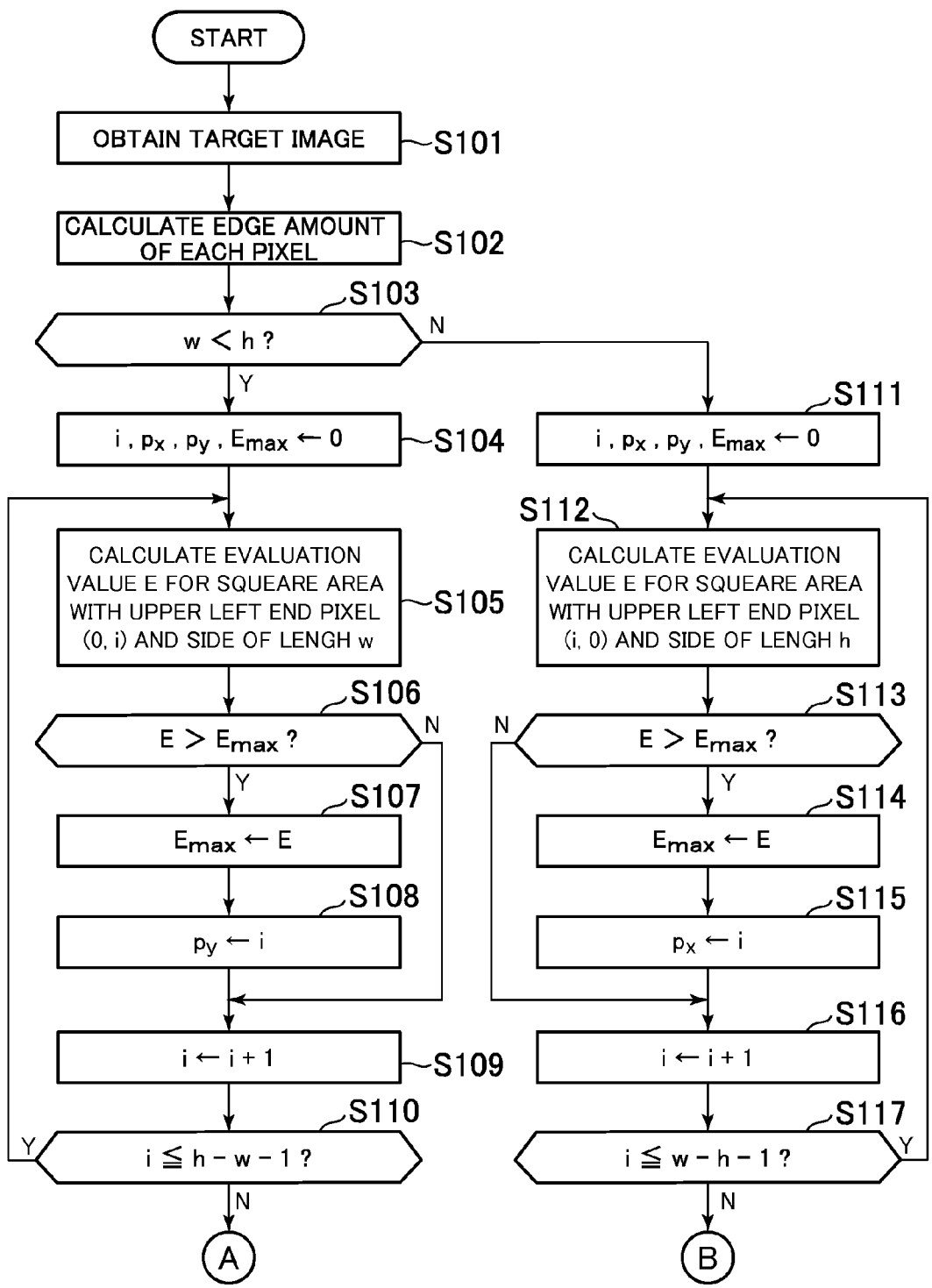
FIG. 12 is a flowchart showing one example of processing executed in the image processing device.

In the following, processing that is executed in the image processing device 10 to implement the above described function blocks will be described. FIGS. 12 and 13 show a flowchart showing one example of processing executed in the image processing device 10 to obtain the trimming image 40 from the target image (the cooking image 30). The processing shown in FIGS. 12 and 13 is based on an assumption that the target image (the cooking image 30) is a rectangular image. The control unit 11 executes the processing shown in FIGS. 12 and 13 according to a program to thereby function as the trimming candidate area setting unit 50, the calculation unit 52, the trimming area determination unit 54, and the trimming image obtaining unit 56.

As shown in FIG. 12, initially, the control unit 11 obtains a target image from the database 20 (S101). Then, the control unit 11 calculates the edge amount of each pixel of the target image by the above mentioned expressions (1) to (5) (S102).

Further, the control unit 11 determines whether or not the length (h) of the vertical side of the target image is longer than the length (w) of the horizontal side thereof (S103). When it is determined that the length (h) of the vertical side is longer than the length (w) of the horizontal side, the control unit 11 initializes the variables i, $p_x$, $p_y$, $E_{max}$ to zero (S104).

After execution of the processing at step S104, the control unit 11 calculates an evaluation value E for a square area (the trimming candidate area 60) having an upper left end pixel at (0, i) and a side of a length "w" (S105). In this embodiment, the control unit 11 calculates the total value T of the edge amounts of the pixels in the above described square area by the above-mentioned expression (6) to obtain the total value T as the evaluation value E for the above described square area.

After execution of the processing at step S105, the control unit 11 determines whether or not the evaluation value E calculated at step S105 is larger than the variable $E_{max}$ (S106). When the evaluation value E is larger than the variable $E_{max}$, the control unit 11 sets the variable $E_{max}$ to the evaluation value E calculated at step S105 (S107). Further, the control unit 11 sets the variable $p_y$ to the variable i (S108). Through the processing at steps S106 to S108, the variable $E_{max}$ indicates the maximum value of the evaluation value E, and the variable $p_y$ indicates the value of the variable i when the evaluation value E is the maximum.

When the processing at steps S107 and S108 is executed or when it is determined at step S106 that the evaluation value E is not larger than the variable $E_{max}$, the control unit 11 adds one to the variable i (S109). Then, the control unit 11 determines whether or not the variable i is equal to or smaller than the value (h−w−1) (S110). When the variable i is equal to or smaller than the value (h−w−1), the control unit 11 executes again the processing at step S105. Meanwhile, when the variable i is not equal to or smaller than the value (h−w−1), as shown in FIG. 13, the control unit 11 determines a square area having an upper left end pixel at ($p_x$, $p_y$) and a side of a length "w" as the trimming area (S118).

Meanwhile, when it is determined at step S103 that the length (h) of the vertical side is not longer than the length (w) of the horizontal side, in other words, when the length (w) of the horizontal side is longer than the length (h) of the vertical side, the control unit 11 initializes the variables i, $p_x$, $p_y$, $E_{max}$ to zero (S111).

After execution of the processing at step S111, the control unit 11 calculates an evaluation value E for a square area (the trimming candidate area 60) having an upper left end pixel at (i, 0) and one side including the number "h" of pixels (S112). In this embodiment, the control unit 11 calculates the total value T of the edge amounts of the pixels in the above described square area by the above-mentioned expression (7) to obtain the total value T as an evaluation value E for the above described square area.

After execution of the processing at step S112, the control unit 11 determines whether or not the evaluation value E calculated at step S112 is larger than the variable $E_{max}$ (S113). When the evaluation value E is larger than the variable $E_{max}$, the control unit 11 sets the variable $E_{max}$ to the evaluation value E calculated at step S112 (S114). Further, the control unit 11 sets the variable $p_x$ to the variable i (S115). Through the processing at steps S113 to S115, the variable $E_{max}$ indicates the maximum value of the evaluation value E, and the variable $p_x$ indicates the value of the variable i when the evaluation value E is the maximum.

After execution of the processing at steps S114 and S115 or when it is determined at step S113 that the evaluation value E is not larger than the variable $E_{max}$, the control unit 11 adds one to the variable i (S116). Then, the control unit 11 determines whether or not the variable i is equal to or smaller than the value (w−h−1) (S117). When the variable i is equal to or smaller than the value (w−h−1), the control unit 11 executes again the processing at step S112. Meanwhile, when the variable i is not equal to or smaller than the value (w−h−1), as shown in FIG. 13, the control unit 11 determines a square area having an upper left end pixel at ($p_x$, $p_y$) and one side including the number "h" of pixels as the trimming area (S119).

After execution of the processing at step S118 or S119, the control unit 11 obtains the trimming image 40 (S120). That is, the control unit 11 cuts out an image shown in the trimming area determined at step S118 or S119 from the target image to thereby obtain the trimming image 40, and stores the trimming image 40 in the database 20 so as to be correlated to the target image. Further, the control unit 11 displays the trimming image 40 obtained at step S120 on the display unit 16 (S121). With the above, description on the processing in FIGS. 12 and 13 is finished.

According to the image processing device 10 according to the first embodiment described above, a part having a larger edge amount in the target image is obtained as the trimming image 40. That is, a part having a large change in the hue (color phase) in the target image is obtained as the trimming image 40. For example, in the case of a cooking image showing food on a dish on a table or the like, change in the hue is larger in apart showing the food, compared to other parts (for example, a part showing a table or the like). Thus, according to the image processing device 10 according to the first embodiment, it is possible to obtain the part showing the food as the trimming image 40.

Second Embodiment

In the following, a second embodiment of the present invention will be described. A hardware structure of the image processing device 10 according to the second embodiment of the present invention is similar to that in the first embodiment (see FIG. 1). In the image processing device 10 according to the second embodiment as well, a trimming image 40 of an image (the cooking image 30) stored in the database 20 is generated.

In the first embodiment, a square area having an upper left end pixel being a pixel ($p_x$, $p_y$) expressed by the above-mentioned expressions (8) and (9) and a side of a length min{w, h} is determined as the trimming area. Meanwhile, in the second embodiment, a square area having an upper left end pixel being a pixel ($p_x$, $p_y$) expressed by the below-mentioned expressions (10) and (11) and a side of a length min{w, h} is determined as the trimming area. In this point, the image processing device 10 according to the second embodiment differs from that in the first embodiment.

[Expression 5]

$$p_x = \begin{cases} \underset{i}{\operatorname{argmax}} \dfrac{\sum_{Y=0}^{h-1}\sum_{X=i}^{i+h-1} S_{X,Y}}{\sum_{Y=0}^{h-1}(S_{i,Y} + S_{i+h-1,Y})} & \text{if } w > h \\ 0 & \text{otherwise} \end{cases} \quad (10)$$

$$p_y = \begin{cases} \underset{i}{\operatorname{argmax}} \dfrac{\sum_{Y=i}^{i+w-1}\sum_{X=0}^{w-1} S_{X,Y}}{\sum_{X=0}^{w-1}(S_{X,i} + S_{X,i+w-1})} & \text{if } w < h \\ 0 & \text{otherwise} \end{cases} \quad (11)$$

The image processing device 10 according to the second embodiment includes function blocks similar to those in the first embodiment (see FIG. 7). Operations of the trimming candidate area setting unit 50, the calculation unit 52, and the trimming image obtaining unit 56 are similar to those in the first embodiment. Meanwhile, an operation of the trimming area determination unit 54 is common to that in the first embodiment in that a trimming area is determined from among a plurality of trimming candidate areas 60 based on the total value T of each of the plurality of trimming candidate areas 60, but different from the first embodiment in the point described below.

In the second embodiment, the trimming area determination unit 54 calculates, with respect to each of the plurality of trimming candidate areas 60, the total value of the edge amounts of the pixels in at least one boundary part of the trimming candidate area 60.

Note that the "at least one boundary part" refers to at least one of the upper boundary part, the lower boundary part, the left boundary part, and the right boundary part of the trimming candidate area 60.

FIG. 14 explains the upper boundary part and the lower boundary part of the trimming candidate area 60. FIG. 14 shows a case of the cooking image 30 being a vertically long image.

The upper boundary part 70U includes one or more pixel rows including a pixel row corresponding to the upper boundary 62U of the trimming candidate area 60.

For example, the upper boundary part 70U includes a pixel row constituting the upper boundary 62U of the trimming candidate area 60. That is, assuming that the upper left end pixel of the trimming candidate area 60 is at (0, y), the upper boundary part 70U is a pixel row including pixels (0, y) to (w−1, y). The upper boundary part 70U may include a plurality of pixel rows from a pixel row including pixels (0, y) to (w−1, y) to a pixel row including pixels (0, y+n) to (w−1, y+n) (n: natural number equal to or larger than one).

Similarly, the lower boundary part 70D includes one or more pixel rows including a pixel row corresponding to the lower boundary 62D of the trimming candidate area 60.

For example, the lower boundary part 70D includes a pixel row constituting the lower boundary 62D of the trimming candidate area 60. That is, assuming that the upper left end pixel of the trimming candidate area 60 is at (0, y), the lower boundary part 70D is a pixel row including pixels (0, y+w−1) to (w−1, y+w−1). The lower boundary part 70D may include a plurality of pixel rows from a pixel row including pixels (0, y+w−1) to (w−1, y+w−1) to a pixel row including pixels (0, y+w−1−n) to (w−1, y+w−1−n) (n: natural number equal to or larger than one).

The description below is based on an assumption that a pixel row constituting the upper boundary 62U of the trimming candidate area 60 corresponds to the upper boundary part 70U, and a pixel row constituting the lower boundary 62D corresponds to the lower boundary part 70D.

FIG. 15 explains the left boundary part and the right boundary part of the trimming candidate area 60. FIG. 15 shows a case of the cooking image 30 being a horizontally long image.

The left boundary part 70L includes one or more pixel columns including a pixel column corresponding to the left boundary 62L of the trimming candidate area 60.

For example, the left boundary part 70L includes a pixel column constituting the left boundary 62L of the trimming candidate area 60. That is, assuming that the upper left end pixel of the trimming candidate area 60 is at (x, 0), the left boundary part 70L is a pixel column including pixels (x, 0) to (x, h−1). The left boundary part 70L may include a plurality of pixel columns from a pixel column including pixels (x, 0) to (x, h−1) to a pixel column including pixels (x+n, 0) to (x+n, h−1) (n: natural number equal to or larger than one).

Similarly, the right boundary part 70R includes one or more pixel columns including a pixel column corresponding to the right boundary 62R of the trimming candidate area 60.

For example, the right boundary part 70R includes a pixel column constituting the right boundary 62R of the trimming candidate area 60. That is, assuming that the upper left pixel of the trimming candidate area 60 is at (x, 0), the right boundary part 70R is a pixel column including pixels (x+h−1, 0) to (x+h−1, h−1). The right boundary part 70R may include a plurality of pixel columns from a pixel column including pixels (x+h−1, 0) to (x+h−1, h−1) to a pixel column including pixels (x+h−1−n, 0) to (x+h−1−n, h−1) (n: natural number equal to or larger than one).

The description below is based on an assumption that a pixel column constituting the left boundary 62L of the trimming candidate area 60 corresponds to the left boundary part 70L, and a pixel column constituting the right boundary 62R corresponds to the right boundary part 70R.

For example, if the cooking image 30 is a vertically long image, the trimming area determination unit 54 calculates the total value Ta of the edge amounts of the pixels in the upper boundary part 70U and the lower boundary part 70D of the trimming candidate area 60. Assuming that the upper left end pixel of the trimming candidate area 60 is at (0, i), the above described total value Ta is calculated by the below-mentioned expression (12).

Meanwhile, if the cooking image 30 is a horizontally long image, the trimming area determination unit 54 calculates the total value Ta of the edge amounts of the pixels in the left boundary part 70L and the right boundary part 70R of the trimming candidate area 60. Assuming that the upper left end pixel of the trimming candidate area 60 is at (i, 0), the above described total value Ta is calculated by the below-mentioned expression (13).

[Expression 6]

$$Ta = \sum_{X=0}^{w-1}(S_{X,i} + S_{X,i+w-1}) \quad (12)$$

$$Ta = \sum_{Y=0}^{h-1}(S_{i,Y} + S_{i+h-1,Y}) \quad (13)$$

The trimming area determination unit 54 (second calculation means) calculates, with respect to each of the plurality of trimming candidate areas 60, a divided value (T/Ta) by dividing the total value T by the total value Ta. Then, the trimming area determination unit 54 determines a trimming area from among the plurality of trimming candidate areas 60, based on the divided value (T/Ta) of each of the plurality of trimming character areas 60. For example, the trimming area determination unit 54 determines a trimming candidate area 60 with the largest divided value (T/Ta) among the plurality of trimming candidate areas 60 as the trimming area.

Alternatively, the trimming area determination unit 54 may calculate, with respect to each of the plurality of trimming candidate areas 60, a divided value (Ta/T) by dividing the total value Ta by the total value T. Then, the trimming area determination unit 54 may determine a trimming area from among the plurality of trimming candidate areas 60, based on the divided value (Ta/T) of each of the plurality of trimming character areas 60. For example, the trimming area determination unit 54 may determine a trimming candidate area 60 with the smallest divided value (Ta/T) among the plurality of trimming candidate areas 60 as the trimming area.

In the above described manner, in the image processing device 10 according to the second embodiment, a square area having an upper left end pixel being a pixel ($p_x$, $p_y$) expressed by the above mentioned expressions (10) and (11) and a side of a length min{w, h} is determined as the trimming area.

Processing that is executed in the image processing device 10 according to the second embodiment will be described. Processing similar to that in the first embodiment is executed in the image processing device 10 according to the second embodiment as well (see FIGS. 12 and 13).

In the second embodiment, however, at step S105 in FIG. 12, the control unit 11 obtains the divided value (T/Ta) calculated by dividing the total value T calculated by the above-mentioned expression (6) by the total value Ta calculated by the above-mentioned expression (12) as the evaluation value E.

In addition, at step S112, the control unit 11 obtains the divided value (T/Ta) calculated by dividing the total value T calculated by the above-mentioned expression (7) by the total value Ta calculated by the above-mentioned expression (13) as the evaluation value E.

In the above described image processing device 10 according to the second embodiment, a trimming candidate area 60 with the largest divided value (T/Ta) is determined as the trimming area. When the total value T of the edge amounts of the pixels in the entire trimming candidate area 60 is large and the total value Ta of the edge amounts of the pixels in the upper boundary part 70U and the lower boundary part 70D of the trimming candidate area 60 is small, the divided value (T/Ta) results in large. A case in which the total value T of the edge amount of the pixels in the entire trimming candidate area 60 is large and the total value Ta of the edge amounts of the pixels in the upper boundary part 70U and the lower boundary part 70D of the trimming candidate area 60 is small refers to a case in which the edge amount of the pixels in a part other than the upper boundary part 70U and the lower boundary part 70D is large, that is, a case in which the edge amount of the pixels in a middle part is larger, compared to that in the upper boundary part 70U and the lower boundary part 70D.

According to the image processing device 10 according to the second embodiment, it is possible to obtain, from the target image, a trimming image 40 in which a part with a large edge amount is positioned at the center. That is, it is possible to obtain, from the target image, a trimming image 40 in which a part with a large change in the hue is positioned at the center. As a result, it is possible to obtain, from the cooking image 30, a trimming image 40 in which a part showing food is positioned at the center.

Below, a modified example of the second embodiment will be described.

For example, the trimming area determination unit 54 may determine a square area having an upper left end pixel being a pixel ($p_x$, $p_y$) expressed by the below-mentioned expressions (14) and (15) and a side of a length min{w, h} as the trimming area.

[Expression 7]

$$p_x = \begin{cases} \underset{i}{\mathrm{argmax}} \dfrac{\sum_{Y=0}^{h-1}\sum_{X=i}^{i+h-1} S_{X,Y}}{\max\left\{\sum_{Y=0}^{h-1} S_{i,Y}, \sum_{Y=0}^{h-1} S_{i+h-1,Y}\right\}} & \text{if } w > h \\ 0 & \text{otherwise} \end{cases} \quad (14)$$

$$p_y = \begin{cases} \underset{i}{\mathrm{argmax}} \dfrac{\sum_{Y=i}^{i+\omega-1}\sum_{X=0}^{w-1} S_{X,Y}}{\max\left\{\sum_{X=0}^{w-1} S_{X,i}, \sum_{X=0}^{w-1} S_{X,i+w-1}\right\}} & \text{if } w > h \\ 0 & \text{otherwise} \end{cases} \quad (15)$$

In this modified example, if the cooking image 30 is a vertically long image, the trimming area determination unit 54 calculates the total value Tu (a first total value) of the edge amounts of the pixels in the upper boundary part 70U of the trimming candidate area 60 and the total value Td (a second total value) of the edge amounts of the pixels in the lower boundary part 70D of the trimming candidate area 60. Assuming that the upper left end pixel of the trimming candidate area 60 is at (0, i), the above-mentioned total value Tu is calculated by the below-mentioned expression (16), and the above-mentioned total value Td is calculated by the below-mentioned expression (17).

[Expression 8]

$$Tu = \sum_{X=0}^{w-1} S_{X,i} \quad (16)$$

$$Td = \sum_{X=0}^{w-1} S_{X,i+w-1} \quad (17)$$

The trimming area determination unit 54 calculates, with respect to each of the plurality of trimming candidate areas 60, a divided value (T/max{Tu, Td}) by dividing the total value T by larger one of the total values Tu and Td. Then, the trimming area determination unit 54 determines a trimming area from among the plurality of trimming candidate areas 60, based on the divided value (T/max{Tu, Td}) of each of the plurality of trimming candidate areas 60. For example, the trimming area determination unit 54 determines a trimming candidate area 60 with the largest divided value (T/max{Tu, Td}) among the plurality of trimming candidate areas 60 as the trimming area.

The trimming area determination unit 54 may calculate, with respect to each of the plurality of trimming candidate areas 60, a divided value (max{Tu, Td}/T) by dividing larger one of the total values Tu and Td by the total value T. Then, the trimming area determination unit 54 may determine a trimming area from among the plurality of trimming candidate areas 60, based on the divided value (max{Tu, Td}/T) of each of the plurality of trimming candidate areas 60. For example, the trimming area determination unit 54 may determine a trimming candidate area 60 with the smallest divided value (max{Tu, Td}/T) among the plurality of trimming candidate areas 60 as the trimming area.

Meanwhile, if the cooking image 30 is a horizontally long image, the trimming area determination unit 54 calculates the total value Tl (a first total value) of the edge amounts of the pixels in the left boundary part 70L of the trimming candidate area 60 and the total value Tr (a second total value) of the edge amounts of the pixels in the right boundary part 70R of the trimming candidate area 60. Assuming that the upper left end pixel of the trimming candidate area 60 is at (i, 0), the total value Tl is calculated by the below-mentioned expression (18), and the total value Tr is calculated by the below-mentioned expression (19).

[Expression 9]

$$Tl = \sum_{Y=0}^{h-1} S_{i,Y} \quad (18)$$

$$Tr = \sum_{Y=0}^{h-1} S_{i+h-1,Y} \quad (19)$$

Then, the trimming area determination unit 54 calculates, with respect to each of the plurality of trimming candidate areas 60, a divided value (T/max{Tl, Tr}) by dividing the total value T by larger one of the total values Tl and Tr. Then, the trimming area determination unit 54 determines a trimming area from among the plurality of trimming candidate areas 60, based on the divided value (T/max{Tl, Tr}) of each of the plurality of trimming candidate areas 60. For example, the trimming area determination unit 54 determines a trimming candidate area 60 with the largest divided value (T/max{Tl, Tr}) among the plurality of trimming candidate areas 60 as the trimming area.

Alternatively, the trimming area determination unit 54 may calculate, with respect to each of the plurality of trimming candidate areas 60, a divided value (max{Tl, Tr}/T) by dividing larger one of the total values Tl and Tr by the total value T. Then, the trimming area determination unit 54 may determine a trimming area from among the plurality of trimming candidate areas 60, based on the divided value (max{Tl, Tr}/T) of each of the plurality of trimming candidate areas 60. For example, the trimming area determination unit 54 may determine a trimming candidate area 60 with the smallest (max{Tl, Tr}/T) among the plurality of trimming candidate areas 60 as the trimming area.

In the modified example, processing to be described below is executed at steps S105 and S112 in FIG. 12. That is, at step S105, the control unit 11 obtains the divided value (T/max{Tu, Td}) calculated by dividing the total value T calculated by the above-mentioned expression (6) by larger one of the total values Tu and Td calculated by the above-mentioned expressions (16) and (17) as the evaluation value E.

Further, at step S112, the control unit 11 obtains the divided value (T/max{Tl, Tr}) calculated by dividing the total value T calculated by the above-mentioned expression (7) by larger one of the total values Tl and Tr calculated by the above-mentioned expressions (18) and (19) as the evaluation value E.

In the above described manner as well, it is possible to obtain, from the target image, a trimming image where a part with a large edge amount is positioned at the center. That is, it is possible to obtain, from the target image, a trimming image where a part with a large change in the hue is positioned at the center. As a result, it is possible to obtain, from the cooking image 30, a trimming image where a part showing food is positioned at the center.

Third Embodiment

In the following, a third embodiment of the present invention will be described. A hardware structure of the image processing device 10 according to the third embodiment of the present invention is similar to that in the first embodiment (see FIG. 1). In the image processing device 10 according to the third embodiment as well, a trimming image 40 of an image (the cooking image 30) stored in the database 20 is generated.

In the first embodiment, a square area having an upper left end pixel being a pixel ($p_x$, $p_y$) expressed by the above-mentioned expressions (8) and (9) and a side of a length min{w, h} is determined as the trimming area. Meanwhile, in the third embodiment, a square area having an upper left end pixel being a pixel ($p_x$, $p_y$) expressed by the below-mentioned expressions (20) and (21) and a side of a length min{w, h} is determined as the trimming area. "G" in the below-mentioned expressions (20) and (21) indicates a gauss function indicated by the below-mentioned expression (22).

[Expression 10]

$$p_x = \begin{cases} \operatorname{argmax}_i \sum_{Y=0}^{h-1} \sum_{X=i}^{i+h-1} G\left(X, i+\frac{h}{2}, \frac{h}{6}\right) G\left(Y, \frac{h}{2}, \frac{h}{6}\right) & \text{if } w > h \\ 0 & \text{otherwise} \end{cases} \quad (20)$$

$$p_y = \begin{cases} \underset{i}{\operatorname{argmax}} \sum_{Y=i}^{i+w-1} \sum_{X=0}^{w-1} G\left(X, \frac{w}{2}, \frac{w}{6}\right) G\left(Y, i+\frac{w}{2}, \frac{w}{6}\right) S_{X,Y} & \text{if } w < h \\ 0 & \text{otherwise} \end{cases} \quad (21)$$

$$G(x, \mu, \sigma) = \frac{1}{\sqrt{2\pi\sigma^2}} \exp\left(-\frac{(x-\mu)^2}{2\sigma^2}\right) \quad (22)$$

The image processing device 10 according to the third embodiment includes a function block similar to that in the first embodiment (see FIG. 7). Operations of the trimming candidate area setting unit 50 and the trimming image obtaining unit 56 are similar to those in the first embodiment. Meanwhile, operations of the calculation unit 52 and the trimming area determination unit 54 are different from those in the first embodiment in the point described below.

The calculation unit 52 in the third embodiment calculates, with respect to each of the plurality of trimming candidate areas 60, a weighted total value of the edge amounts of the pixels in the trimming candidate area 60.

For example, if the cooking image 30 is a vertically long image, assuming that the upper left end pixel of the trimming candidate area 60 is at (0, i), the weighted total value T mentioned above is calculated by the below-mentioned expression (23). Meanwhile, if the cooking image 30 is a horizontally long image, assuming that the upper left end pixel of the trimming candidate area 60 is at (i, 0), the weighted total value T mentioned above is calculated by the below-mentioned expression (24).

In the below-mentioned expressions (23) and (24), the gauss function G serves as a weight for the edge amount of each pixel. In this case, a larger weight is set for a pixel in the middle part in the trimming candidate area 60 than that for a pixel in a boundary part of the trimming candidate area 60. This results in a larger weighted total value T with respect to a larger edge amount of a pixel in the middle part in the trimming candidate area 60.

[Expression 11]

$$T = \sum_{Y=i}^{i+w-1} \sum_{X=0}^{w-1} G\left(X, \frac{w}{2}, \frac{w}{6}\right) G\left(Y, i+\frac{w}{2}, \frac{w}{6}\right) S_{X,Y} \quad (23)$$

$$T = \sum_{Y=0}^{h-1} \sum_{X=i}^{i+h-1} G\left(X, i+\frac{h}{2}, \frac{h}{6}\right) G\left(Y, \frac{h}{2}, \frac{h}{6}\right) S_{X,Y} \quad (24)$$

The trimming area determination unit 54 determines a trimming area from among the plurality of trimming candidate areas 60, based on the weighted total value T of each of the plurality of trimming candidate areas 60. For example, the trimming area determination unit 54 determines a trimming candidate area 60 with the largest weighted total value T among the plurality of trimming candidate areas 60 as the trimming area.

Processing that is executed in the image processing device 10 according to the third embodiment will be described. In the image processing device 10 according to the third embodiment as well, processing similar to that in the first embodiment is executed (see FIGS. 12 and 13).

In the third embodiment, however, the control unit 11 obtains the weighted total value T calculated by the above-mentioned expression (23) as the evaluation value E at step S105 in FIG. 12. In addition, the control unit 11 obtains the weighted total value T calculated by the above-mentioned expression (24) as the evaluation value E at step S112.

In the image processing device 10 according to the third embodiment described above, a trimming candidate area 60 with the largest weighted total value T is determined as the trimming area. The weighted total value T results in larger with respect to a larger edge amount of a pixel in the middle part in the trimming candidate area 60. Therefore, according to the image processing device 10 according to the third embodiment, a trimming candidate area 60 with a larger edge amount of a pixel in the middle part is determined as the trimming area. As a result, according to the image processing device 10 according to the third embodiment, it is possible to obtain, from the target image, a trimming image 40 where a part with a large edge amount is positioned at the center. That is, it is possible to obtain, from the target image, a trimming image 40 where a part with a large change in the hue is positioned at the center. As a result, it is possible to obtain, from the cooking image 30, a trimming image 40 where a part showing food is positioned at the center.

A modified example of the third embodiment will be described.

For example, the trimming area determination unit 54 may determine a square area having an upper left end pixel being a pixel ($p_x$, $p_y$) expressed by the below-mentioned expressions (25) and (26) and a side of a length min{w, h} as the trimming area.

[Expression 12]

$$p_x = \begin{cases} \underset{i}{\operatorname{argmax}} \sum_{Y=0}^{h-1} \sum_{X=i}^{i+h-1} G\left(X, i+\frac{h}{2}, \frac{h}{6}\right) S_{X,Y} & \text{if } w > h \\ 0 & \text{otherwise} \end{cases} \quad (25)$$

$$p_y = \begin{cases} \underset{i}{\operatorname{argmax}} \sum_{Y=i}^{i+w-1} \sum_{X=0}^{w-1} G\left(Y, i+\frac{w}{2}, \frac{w}{6}\right) S_{X,Y} & \text{if } w < h \\ 0 & \text{otherwise} \end{cases} \quad (26)$$

In this modified example, if the cooking image 30 is a vertically long image, assuming that the upper left end pixel of the trimming candidate area 60 is at (0, i), the above-mentioned weighted total value T is calculated by the below-mentioned expression (27).

In the below-mentioned expressions (27), the gauss function G serves as a weight for the edge amount of each pixel. In this case, a higher weight is set for a pixel in the middle part of the trimming candidate area 60, compared to that for a pixel in the upper boundary part 70U and the lower boundary part 70D in the trimming candidate area 60. This results in a larger weighted total value T with respect to a larger edge amount of a pixel in the middle part in the trimming candidate area 60.

Meanwhile, if the cooking image 30 is a horizontally long image, assuming that the upper left end pixel of the trimming candidate area 60 is at (i, 0), the above-mentioned weighted total value T is calculated by the below-mentioned expression (28).

In the below-mentioned expression (28) as well, the gauss function G serves as a weight for the edge amount of each pixel. In this case, a higher weight is set for a pixel in the middle part in the trimming candidate area 60, compared to that for a pixel in the left boundary part 70L and the right boundary part 70R in the trimming candidate area 60. This results in a larger weighted total value T with respect to a larger edge amount of a pixel in the middle part of the trimming candidate area 60.

[Expression 13]

$$T = \sum_{Y=i}^{i+w-1} \sum_{X=0}^{w-1} G\left(Y, i+\frac{w}{2}, \frac{w}{6}\right) S_{X,Y} \quad (27)$$

$$T = \sum_{Y=0}^{h-1} \sum_{X=i}^{i+h-1} G\left(X, i+\frac{h}{2}, \frac{h}{6}\right) S_{X,Y} \quad (28)$$

In this modified example, processing to be described below is executed at S105 and S112 in FIG. 12. That is, the control unit 11 obtains the weighted total value T calculated by the above-mentioned expression (27) as the evaluation value E at step S105. In addition, the control unit 11 obtains the weighted total value T calculated by the above-mentioned expression (28) as the evaluation value E at step S112.

In the above described manner as well, it is possible to determine a trimming candidate area 60 with a large edge amount of pixels in a middle part as the trimming area. As a result, according to the image processing device 10 according to the third embodiment, it is possible to obtain, from the target image, a trimming image 40 where a part with a large edge amount is positioned at the center. That is, it is possible to obtain, from the target image, a trimming image 40 where a part with a large change in the hue is positioned at the center. As a result, it is possible to obtain, from the cooking image 30, a trimming image 40 where a part showing food is positioned at the center.

Fourth Embodiment

In the following, a fourth embodiment of the present invention will be described. A hardware structure of the image processing device 10 according to the fourth embodiment of the present invention is similar to that in the first embodiment (see FIG. 1). In the image processing device 10 according to the fourth embodiment as well, a trimming image 40 of an image (the cooking image 30) stored in the database 20 is generated.

In the first embodiment, the "edge" refers to an extent of change in the color in the target image, and the "edge amount of a pixel" refers to an amount relevant to a difference in the hue (color phase) between a pixel and a pixel around that pixel. Meanwhile, in the fourth embodiment, the fourth embodiment is different from the first embodiment in that the "edge" refers to an extent of change in the brightness in the target image, and an "edge amount of a pixel" refers to an amount relevant to a difference in the brightness between a pixel and a pixel around the pixel.

That is, in the image processing device 10 according to the fourth embodiment, the Y value of each pixel calculated by the above-mentioned expression (4) is used as the pixel value I of the pixel. That is, in the fourth embodiment, the Y value of each pixel is substituted into the above-mentioned expressions (1) to (3) as the pixel value I of the pixel to calculate the edge amount S of the pixel.

The fourth embodiment can be combined with the second embodiment and the third embodiment. That is, the "edge amount of a pixel" may be defined as an amount relevant to a difference in the brightness between a pixel and a pixel around the pixel in the second embodiment and the third embodiment as well.

According to the image processing device 10 according to the fourth embodiment described above, a part with a large change in the brightness of the target image is obtained as the trimming image 40. For example, in the case of a cooking image showing food on a dish on a table or the like, change in the brightness is larger in a part showing the food, compared to other parts (for example, a part showing the table, or the like). Therefore, according to the image processing device 10 according to the fourth embodiment, it is possible to obtain the part showing food as the trimming image 40.

Fifth Embodiment

In the following, a fifth embodiment of the present invention will be described. A hardware structure of the image processing device 10 according to the fifth embodiment of the present invention is similar to that in the first embodiment (see FIG. 1). In the image processing device 10 according to the fifth embodiment as well, a trimming image 40 of an image (the cooking image 30) stored in the database 20 is generated.

In the image processing device 10 according to the fifth embodiment, a plurality of kinds of processing are prepared in advance as processing for determining a trimming area (hereinafter referred to as "trimming area determination processing"), and a plurality of trimming areas are determined through the plurality of kinds of trimming area determination processings. Then, a plurality of trimming images corresponding to the plurality of trimming areas are presented to a user, so that the user can select any of the plurality of trimming images 40.

FIG. 16 shows one example of a plurality of kinds of trimming area determination processings. FIG. 16 shows eight kinds of trimming area determination processings (first to eighth trimming area determination processings). The first to eighth trimming area determination processings are different from one another in the points described below:

(1) which of a hue or brightness is used as a basis for calculation of the edge amount of each pixel; and (2) how to define the upper left end pixel at ($p_x$, $p_y$) of the trimming area.

The first trimming area determination processing corresponds to the first embodiment. That is, the first trimming area determination processing is processing for calculating the edge amount S of each pixel based on the $C_B$, $C_R$ values (hue) of the pixel (see the above-mentioned expression (5)), and determining a square area having an upper left end pixel being a pixel ($p_x$, $p_y$) expressed by the above-mentioned expressions (8) and (9) as the trimming area.

The second trimming area determination processing corresponds to the second embodiment. That is, the second trimming area determination processing is processing for calculating the edge amount S of each pixel based on the $C_B$, $C_R$ values (hue) of the pixel (see the above-mentioned expression (5)), and determining a square area having an upper left end pixel being a pixel ($p_x$, $p_y$) expressed by the above-mentioned expressions (10) and (11) as the trimming area.

The third trimming area determination processing corresponds to a modified example of the second embodiment. That is, the third trimming area determination processing is processing for calculating the edge amount S of each pixel based on the $C_B$, $C_R$ values (hue) of the pixel (see the above-mentioned expression (5)), and determining a square area having an upper left end pixel being a pixel ($p_x$, $p_y$) expressed by the above-mentioned expressions (14) and (15) as the trimming area.

The fourth trimming area determination processing corresponds to the third embodiment. That is, the fourth trimming area determination processing is processing for calculating the edge amount S of each pixel based on the $C_B$, $C_R$ values (color phase) of the pixel (see the above-mentioned expression (5)), and determining a square area having an upper left end pixel being a pixel $(p_x, p_y)$ expressed by the above-mentioned expressions (20) and (21) as the trimming area.

Note that the fourth trimming area determination processing may correspond to a modified example of the third embodiment. That is, the fourth trimming area determination processing may be processing for determining a square area having an upper left end pixel being a pixel $(p_x, p_y)$ expressed by the above-mentioned expressions (25) and (26) as the trimming area.

The fifth trimming area determination processing corresponds to the fourth embodiment. That is, the fifth trimming area determination processing is processing for calculating the edge amount S of each pixel based on the Y value (brightness) of the pixel, and determining a square area having an upper left end pixel being a pixel $(p_x, p_y)$ expressed by the above-mentioned expressions (8) and (9) as the trimming area.

The sixth trimming area determination processing corresponds to the combination of the second embodiment and the fourth embodiment. That is, the sixth trimming area determination processing is processing for calculating the edge amount S of each pixel based on the Y value (brightness) of the pixel, and determining a square area having an upper left end pixel being a pixel $(p_x, p_y)$ expressed by the above-mentioned expressions (10) and (11) as the trimming area.

The seventh trimming area determination processing corresponds to the combination of the modified example of the second embodiment and the fourth embodiment. That is, the seventh trimming area determination processing is processing for calculating the edge amount S of each pixel based on the Y value (brightness) of the pixel, and determining a square area having an upper left end pixel being a pixel $(p_x, p_y)$ expressed by the above-mentioned expressions (14) and (15) as the trimming area.

The eighth trimming area determination processing corresponds to the combination of the third embodiment and the fourth embodiment. That is, the eighth trimming area determination processing is processing for calculating the edge amount S of each pixel based on the Y value (brightness) of the pixel, and determining a square area having an upper left end pixel being a pixel $(p_x, p_y)$ expressed by the above-mentioned expressions (20) and (21) as the trimming area.

Note that the eighth trimming area determination processing may correspond to the combination of a modified example of the third embodiment and the fourth embodiment. That is, the eighth trimming area determination processing may be processing for determining a square area having an upper left end pixel being a pixel $(p_x, p_y)$ expressed by the above-mentioned expressions (25) and (26) as the trimming area.

In the image processing device 10 according to the fifth embodiment, the first to eighth trimming area determination processings are executed to determine the first to eighth trimming areas. Then, the first to eighth trimming images 40 corresponding to the first to eighth trimming areas are obtained. Further, a screen (a trimming image selection screen) for selecting any of the first to eighth trimming images 40 is displayed on the display unit 16.

Figure 17:
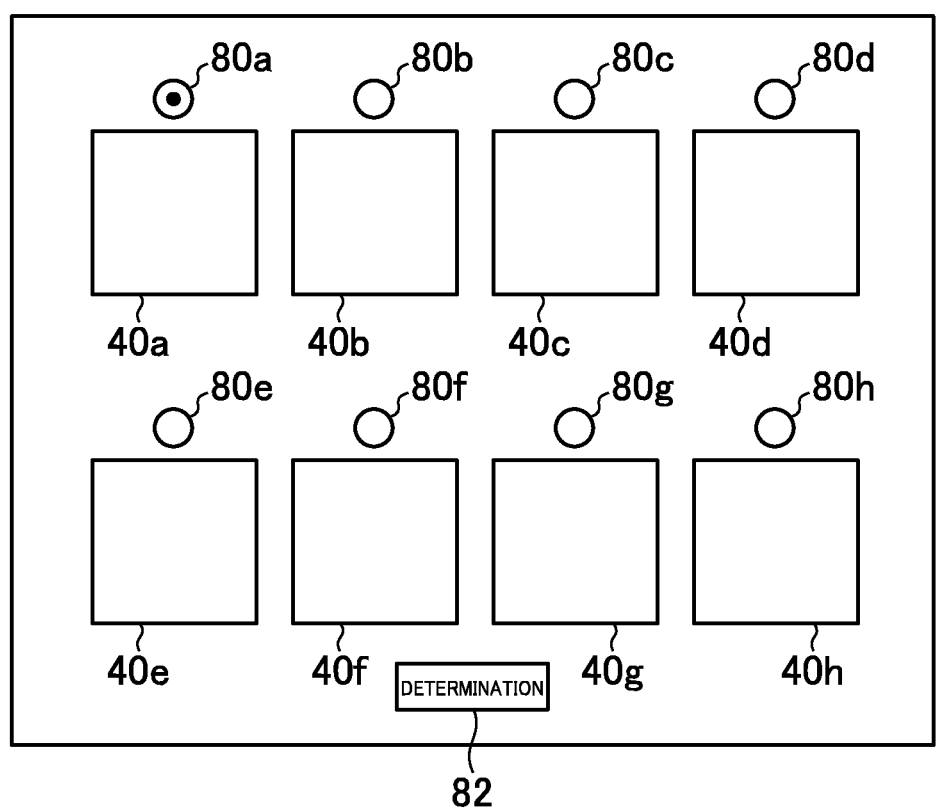
FIG. 17 shows one example of a trimming image selection screen.

FIG. 17 shows one example of the trimming image selection screen. In the trimming image selection screen, a first trimming image 40*a*, a second trimming image 40*b*, a third trimming image 40*c*, a fourth trimming image 40*d*, a fifth trimming image 40*e*, a sixth trimming image 40*f*, a seventh trimming image 40*g*, and an eighth trimming image 40*h* are shown.

In addition, in the trimming image selection screen, a first option button 80*a*, a second option button 80*b*, a third option button 80*c*, a fourth option button 80*d*, a fifth option button 80*e*, a sixth option button 80*f*, a seventh option button 80*g*, and an eighth option button 80*h* are shown. The first option button 80*a* is correlated to the first trimming image 40*a*. Similarly, the second option button 80*b* to the eighth option button 80*h* are correlated to the second trimming image 40*b* to the eighth trimming image 40*h*, respectively.

A user clicks any of the first to eighth option buttons 80*a* to 80*h* to select any of the first to eighth trimming images 40*a* to 40*h*, and then clicks the determination button 82. Upon click on the determination button 82, the trimming image 40 selected by the user is stored in the database 20 so as to be correlated to the original cooking image 30.

Figure 18:
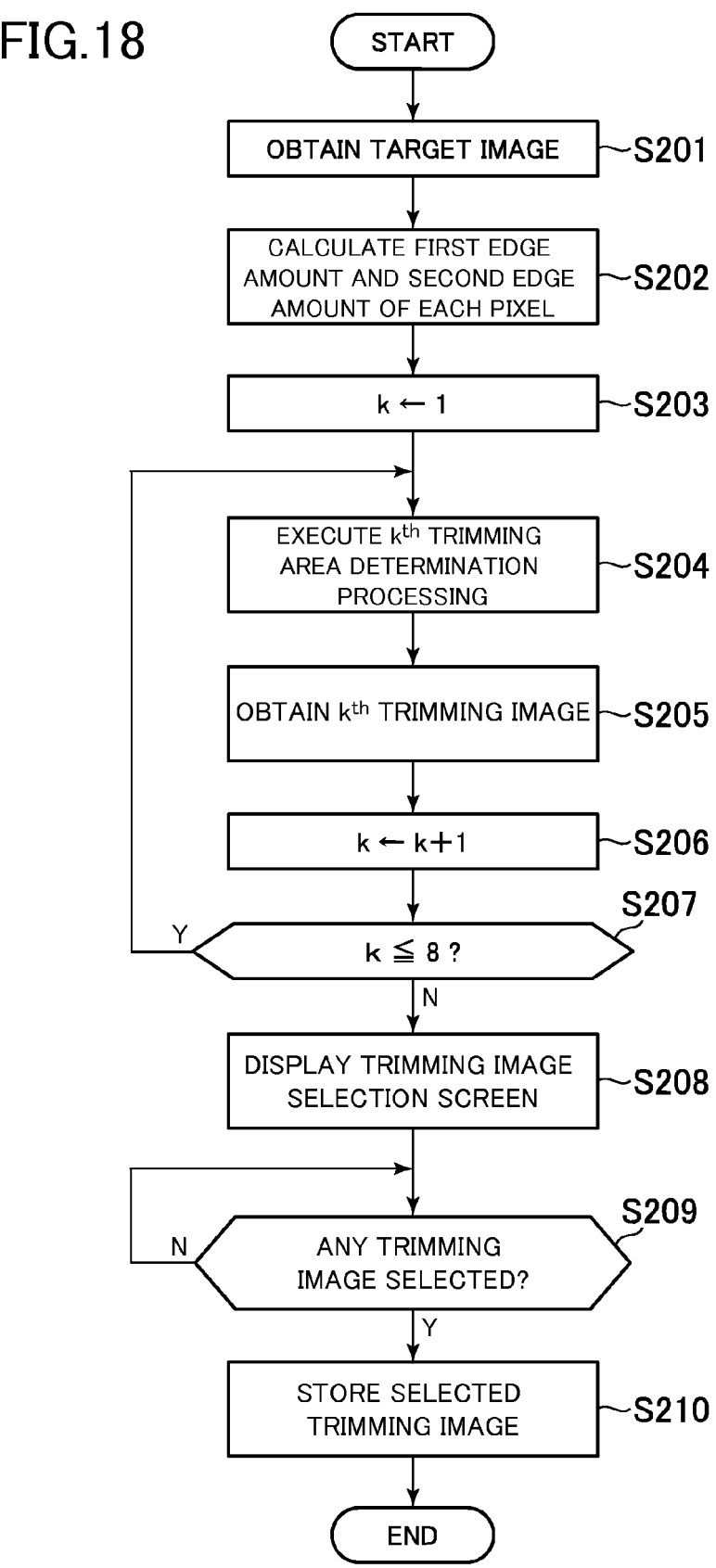
FIG. 18 is a flowchart showing another example of processing executing in the image processing device.

In the following, processing that is executed in the image processing device 10 according to the fifth embodiment will be described. FIG. 18 is a flowchart showing one example of processing executed in the image processing device 10 according to the fifth embodiment.

As shown in FIG. 18, initially, the control unit 11 obtains a target image from the database 20 (S201). Thereafter, the control unit 11 calculates the first edge amount and the second edge amount of each pixel in the target image (S202).

The "first edge amount" refers to an edge amount calculated based on the $C_B$, $C_R$ values (hue) of a pixel. That is, the "first edge amount" is an edge amount S calculated by the above-mentioned expressions (1) to (3) based on the pixel value I expressed by the above-mentioned expression (5).

Meanwhile, the "second edge amount" refers to an edge amount calculated based on the Y value (brightness) of a pixel. That is, the "second edge amount" is an edge amount S calculated by the above-mentioned expressions (1) to (3) using the Y value of the pixel as the pixel value I.

The control unit 11 initializes the variable k to one (S203). Then, the control unit 11 executes $k^{th}$ trimming area determination processing to determine a $k^{th}$ trimming area (S204). The processing at step S204 is similar to that at steps S103 to S119 in FIGS. 12 and 13.

The control unit 11 cut outs an image shown in the $k^{th}$ trimming area determined at step S204 from the target image to thereby obtain a $k^{th}$ trimming image 40 (S205). The obtained $k^{th}$ trimming image 40 is stored in the storage unit 12.

After execution of the processing at step S205, the control unit 11 adds one to the variable k (S206). Then, the control unit 11 determines whether or not the variable k is equal to or smaller than eight (S207). "Eight" is the total number of kinds of trimming area determination processing.

When the variable k is equal to or smaller than eight, the control unit 11 examines again the processing at step S204. Meanwhile, when the variable k is not equal to or smaller than eight, the control unit 11 (display control means) displays the trimming image selection screen on the display unit 16 (S208). As shown in FIG. 17, the first to eight trimming images 40*a* to 40*h* are shown in the trimming image selection screen.

With the trimming image selection screen displayed, the control unit 11 (receiving means) receives selection of any of the first to eight trimming images 40*a* to 40*h* made by the user. That is, the control unit 11 monitors whether or not any of the first to eighth trimming images 40*a* to 40*h* is selected by the user (S209). When any of the first to eighth option buttons 80*a* to 80*h* is clicked and the determination button 82 is clicked, the control unit 11 determines that the user selects any of the first to eighth trimming images 40*a* to 40*h*.

When any of the first to eight trimming images 40*a* to 40*h* is selected by the user, the control unit 11 stores the trimming image 40 selected by the user in the database 20 so as to be correlated to the target image (the cooking image 30) obtained at step S201 (S210). That is, the trimming image 40 selected by the user is stored in the database 20 as a thumbnail image of the target image (the cooking image 30) obtained at step S201. With the above, description on the processing shown in FIG. 18 is finished.

According to the image processing device 10 according to the fifth embodiment described above, the user can select a desired trimming image 40 from among the plurality of trimming image 40 obtained through the plurality of trimming area determination processing.

Sixth Embodiment

In the following, a sixth embodiment of the present invention will be described. The sixth embodiment corresponds to a modified example of the fifth embodiment. A hardware structure of the image processing device 10 according to the sixth embodiment of the present invention is similar to that in the first embodiment (see FIG. 1). In the image processing device 10 according to the sixth embodiment as well, a trimming image 40 of an image (the cooking image 30) stored in the database 20 is generated.

Similar to the fifth embodiment, a plurality of kinds of trimming area determination processings are prepared in advance in the image processing device 10 according to the sixth embodiment as well, so that a plurality of trimming areas are determined through the plurality of kinds of trimming area determination processings. Then, a plurality of trimming images 40 corresponding to the plurality of respective trimming areas are presented to a user, so that the user can select any of the plurality of trimming images 40.

In the image processing device 10 according to the sixth embodiment, however, trimming area determination processing suitable for a characteristic of the target image (the cooking image 30) is selected from among the plurality of kinds of trimming area determination processings, and a trimming image 40 obtained through the selected trimming area determination processing is shown with priority or distinctively in the trimming image selection screen. The image processing device 10 according to the sixth embodiment is different from that in the fifth embodiment in this regard.

In the image processing device 10 according to the sixth embodiment, trimming area determination processing data (correlation data), such as is shown in FIG. 19, for example, is stored in the storage unit 12. The trimming area determination processing data shown in FIG. 19 is data for correlating distribution pattern information on the edge amount and trimming area determination processing. In the trimming area determination processing data shown in FIG. 19, distribution pattern information on the edge amount is correlated to each of the first to eighth trimming area determination processings. The first to eighth trimming area determination processings are similar to those in FIG. 16.

The distribution pattern information on the edge amount is information relevant to a distribution pattern of edge amounts of an image. For example, the distribution pattern information is information indicating a pattern of change of the total value T relative to the vertical or horizontal direction of an image, such as is shown in FIGS. 10 and 11. That is, the distribution pattern information is information indicating a pattern of change of the total value T of the trimming candidate area 60 in the case where the total value T is expressed so as to be correlated to the position of the trimming candidate area 60 (for example, the Y axial coordinate or the X axial coordinate of the upper left end pixel). In other words, the distribution pattern information is information indicating a pattern of change of the total value T expressed on a flat surface that is defined such that a first axis relevant to the position of the trimming candidate area 60 (the Y axis or the X axis in FIGS. 10 and 11) and a second axis relevant the total value T of the trimming candidate area 60 (the T axis in FIGS. 10 and 11) are set orthogonal to each other. For example, the distribution pattern information is information indicating a pattern of change of the total value T calculated based on the first edge amount (that is, an edge amount calculated based on the $C_B$, $C_R$ values of a pixel) and a pattern of change of the total value T calculated based on the second edge amount (that is, an edge amount calculated based on the Y value of a pixel).

Further, for example, the distribution pattern information may be information indicating a pattern of the total value of the edge amounts for every pixel row or column of an image. For example, the distribution pattern information may be information indicating a pattern of the total value of a first edge amount (that is, an edge amount calculated based on the $C_B$, $C_R$ values (hue) of a pixel) for every pixel row or column of the image and a pattern of the total value of a second edge amount (that is, an edge amount calculated based on the Y value (brightness) of a pixel) for every pixel row or column of an image.

Processing that is executed in the image processing device 10 according to the sixth embodiment will be described. Processing executed in the image processing device 10 according to the sixth embodiment is similar to that in the fifth embodiment. That is, processing similar to that shown in FIG. 18 is executed also in the image processing device 10 according to the sixth embodiment. However, the processing executed at step S208 in the image processing device 10 according to the sixth embodiment is different from that in the fifth embodiment. Specifically, processing such as is shown in FIG. 20, for example, is executed at step S208 in the image processing device 10 according to the sixth embodiment.

Specifically, at step S208, the control unit 11 determines whether or not the distribution pattern of the edge amount of the target image obtained at step S201 corresponds to a distribution pattern indicated by any of the first to eighth distribution pattern information items (S301). For example, the control unit 11 determines whether or not the distribution pattern of the edge amount of the target image corresponds to a distribution pattern indicated by any of the first to eighth distribution pattern information items, based on the edge amount of each pixel of the target image obtained at step S201.

When it is determined that the distribution pattern of the edge amount of the target image corresponds to a distribution pattern indicated by any of the first to eighth distribution pattern information items, the control unit 11 (display control means) displays the trimming image selection screen on the display unit 16 (S302). In this case, the control unit 11 preferentially shows the trimming image 40 corresponding to the distribution pattern information indicating the distribution pattern of the edge amount of the target image in the trimming image selection screen.

The "trimming image 40 corresponding to the distribution pattern information" refers to an image shown in a trimming area that is determined through the trimming area determination processing correlated to the distribution pattern information. For example, the fourth distribution pattern information is correlated to the fourth trimming area determination processing in the trimming area determination processing data shown in FIG. 19. Therefore, the "trimming image 40 corresponding to the fourth distribution pattern information" refers to an image shown in a trimming area (a fourth trimming area)

determined through the fourth trimming area determination processing, that is, the fourth trimming image 40d.

Specifically, for example, when it is determined that the distribution pattern of the edge amount of the target image obtained at S201 corresponds to the distribution pattern indicated by the fourth distribution pattern information, the control unit 11 preferentially shows the fourth trimming image 40d in the trimming image selection screen.

For example, the control unit 11 displays the trimming image selection screen with the fourth trimming image 40d selected in advance. That is, the control unit 11 shows the trimming image selection screen image with the fourth option button 80d selected in advance.

Further, for example, for an arrangement for showing the first to eight trimming images 40a to 40h in the trimming image selection screen in a display order according to the order information, the control unit 11 sets the order of the fourth trimming image 40d as the first order.

Further, when it is determined that the distribution pattern of the edge amount of the target image obtained at step S201 corresponds to the distribution pattern indicated by the fourth distribution pattern information, the control unit 11 may distinctively show the fourth trimming image 40d in the trimming image selection screen, instead of preferentially showing the fourth trimming image 40d in the trimming image selection screen. That is, the control unit 11 may display the trimming image selection screen such that the fourth trimming image 40d is shown distinctively from other trimming images 40.

Specifically, for example, the control unit 11 shows the fourth trimming image 40d in a manner different from that for the other trimming image 40. Further, for example, the control unit 11 shows a predetermined image (for example, frame image, balloon image, star image, or the like) so as to be correlated only to the fourth trimming image 40d, to thereby show the fourth trimming image 40d distinctively from the other trimming image 40.

Meanwhile, when it is determined that the distribution pattern of the edge amount of the target image does not correspond to any of the distribution patterns indicated by the first to eighth distribution pattern information items, the control unit 11 displays the trimming image selection screen on the display unit 16 (S303). In this case, the control unit 11 preferentially (distinctively) shows no trimming image 40 in the trimming image selection screen.

After execution of step S302 or S303, the control unit 11 executes the processing at step S209 in FIG. 18. With the above, description on the processing shown in FIG. 20 is finished.

According to the image processing device 10 according to the sixth embodiment described above, trimming area determination processing suitable for a characteristic (a distribution pattern of the edge amount) of the target image (the cooking image 30) is selected, and the trimming image 40 obtained through the trimming area determination processing is shown preferentially or distinctively in the trimming image selection screen. This resultantly makes it possible that the user can more readily select a trimming image 40 obtained through the trimming area determination processing suitable for a characteristic of the target image (the cooking image 30).

In the image processing device 10 according to the sixth embodiment, the trimming area determination processing data may be updated based on the result of selection by the user in the trimming image selection screen. In the following, a structure for updating the trimming area determination processing data will be described.

In this modified example, selection result data, such as is shown in FIG. 21, for example, is stored in the storage unit 12 (or the database 20). In the selection result data shown in FIG. 21, the distribution pattern information on the edge amount is correlated to selection result information. The "distribution pattern information on the edge amount" is similar to that shown in FIG. 19.

"Selection result information" indicates a number of selections of each of the first to eight trimming images 40. In the selection result data shown in FIG. 21, the selection result information correlated to the first distribution pattern information indicates a number of times at which the user selects each of the first to eight trimming images 40 in the trimming image selection screen in the case where the distribution pattern of the edge amount of the target image corresponds to the distribution pattern indicated by the first distribution pattern. This is similarly applicable to the selection result information items correlated to the second to eighth respective distribution pattern information items.

In this modified example, the control unit 11 executes the processing shown in FIG. 22 after execution of the processing at step S210 in FIG. 18.

That is, the control unit 11 determines whether or not the distribution pattern of the edge amount of the target image obtained at step S201 corresponds to a distribution pattern indicated by any of the first to eighth distribution pattern information items (S401). The processing at step S401 is similar to that at step S301 in FIG. 20.

When it is determined that the distribution pattern of the edge amount of the target image corresponds to a distribution pattern indicated by any of the first to eighth distribution pattern information items, the control unit 11 updates the selection result information correlated to that distribution pattern information (S402). For example, when the trimming image 40 selected by the user in the trimming image selection screen is the first trimming image 40a and it is determined at step S401 that the distribution pattern of the edge amount of the target image corresponds to the distribution pattern indicated by the fourth distribution pattern information, the control unit 11 increases by one the "number of selections of the first trimming image 40a" correlated to the fourth distribution pattern information.

After execution of the processing at step S402, the control unit 11 (update means) updates the trimming area determination processing data based on the selection result data (S403).

For example, in the example shown in FIG. 21, as the trimming image 40 with the largest number of selections in the case where the distribution pattern of the edge amount of the target image corresponds to the distribution pattern indicated by the seventh distribution pattern information is the eight trimming image 40h, the control unit 11 updates the trimming area determination processing data such that the trimming area determination processing correlated to the seventh distribution pattern information becomes trimming area determination processing corresponding to the eighth trimming image 40h (that is, eighth trimming area determination processing).

Further, for example, in the example shown in FIG. 21, as the trimming image 40 with the largest number of selections in the case where the distribution pattern of the edge amount of the target image corresponds to the distribution pattern indicated by the eighth distribution pattern information is the seventh trimming image 40g, the control unit 11 updates the trimming area determination processing data such that the trimming area determination processing correlated to the eighth distribution pattern information becomes trimming area determination processing corresponding to the seventh trimming image 40g (that is, the seventh trimming area determination processing).

Meanwhile, when it is determined at step S401 that the distribution pattern of the edge amount of the target image does not correspond to any of the distribution patterns indicated by the first to eighth respective distribution pattern information items, the control unit 11 finishes this processing without executing the processing at steps S402 and S403. With the above, description on the processing at FIG. 22 is finished.

In the above described manner, it is possible to review the correlation between the distribution pattern of the edge amount of the image and the trimming area determination processing in consideration of the result of selection by the user.

Seventh Embodiment

In the following, a seventh embodiment of the present invention will be described. The seventh embodiment corresponds to a modified example of the fifth embodiment. A hardware structure of the image processing device 10 according to the seventh embodiment of the present invention is similar to that in the first embodiment (see FIG. 1). In the image processing device 10 according to the seventh embodiment as well, a trimming image 40 of an image stored in the database 20 (the cooking image 30) is generated.

Similar to the fifth embodiment, in the image processing device 10 according to the seventh embodiment as well, a plurality of kinds of trimming area determination processings are prepared in advance (see FIGS. 16, 19). In the image processing device 10 according to the seventh embodiment, however, trimming area determination processing suitable for a characteristic of a target image (the cooking image 30) is selected from among the plurality of kinds of trimming area determination processings, and a trimming image 40 obtained through the trimming area determination processing is stored as a thumbnail image of the target image. The image processing device 10 according to the seventh embodiment is different from that in the fifth embodiment in this regard.

Processing that is executed in the image processing device 10 according to the seventh embodiment will be described. FIG. 23 is a flowchart showing one example of processing that is executed in the image processing device 10 according to the seventh embodiment. Similar to the fifth embodiment, in the image processing device 10 according to the seventh embodiment as well, trimming area determination processing data shown in FIG. 19 is stored, and the processing shown in FIG. 23 is executed based on the trimming area determination processing data shown in FIG. 19.

As shown in FIG. 23, the control unit 11 obtains a target image from the database 20 (S501). Further, the control unit 11 calculates the first edge amount and the second edge amount of each pixel of the target image (S502). The processing at step S502 is similar to that at step S202 in FIG. 18.

Then, the control unit 11 determines whether or not the distribution pattern of the edge amount of the target image obtained at step S501 corresponds to a distribution pattern indicated by any of the first to eighth distribution pattern information items (S503). The processing at step S503 is similar to that at step S301 in FIG. 20.

When the distribution pattern of the edge amount of the target image corresponds to a distribution pattern indicated by any of the first to eighth distribution pattern information items, the control unit 11 executes the trimming area determination processing correlated to that distribution pattern information to determine a trimming area (S504). The processing at step S504 is similar to that at steps S103 to S119 in FIGS. 12 and 13.

Meanwhile, when the distribution pattern of the edge amount of the target image does not correspond to any of the distribution patterns indicated by the first to eighth distribution pattern information items, the control unit 11 executes predetermined trimming area determination processing (for example, the first trimming area determination processing) among the first to eighth trimming area determination processings to determine a trimming area (S505). The processing at step S505 is similar to that at steps S103 to S119 in FIGS. 12 and 13.

After execution of the processing at step S504 or S505, the control unit 11 cuts out an image shown in the trimming area determined at step S504 or S505 from the target image to thereby obtain the trimming image 40, and stores the trimming image 40 in the database 20 so as to be correlated to the target image (S506). Then, the control unit 11 displays the trimming image 40 on the display unit 16 (S507). With the above, description on the processing shown in FIG. 23 is finished.

According to the above described image processing device 10 according to the seventh embodiment, trimming area determination processing suitable for a characteristic (the distribution pattern of the edge amount) of the target image (the cooking image 30) is selected, and the trimming image 40 obtained through the trimming area determination processing is stored as a thumbnail image of the target image.

The image processing device 10 according to the seventh embodiment may have the structures described in the fifth and sixth embodiments as an option mode. That is, in the image processing device 10 according to the seventh embodiment, the user may be able to select either of the processing shown in FIG. 23 and that in FIG. 18, and when the processing shown in FIG. 18 is selected by the user, the processing shown in FIG. 22 (that is, update processing for trimming area determination processing data) may be executed.

Note that the present invention is not limited to the above described first to seventh embodiments.

[1] For example, it is described in the above that a square image having a side of a length equal to the length of the shorter side of the target image is obtained as the trimming image 40 of the target image. That is, it is described that a square area having a side of a length equal to the length of the shorter side of the target image is set as the trimming candidate area 60.

However, a square image having a side of a length different from the length of the shorter side of the target image may be obtained as the trimming image 40 of the target image. That is, a square area having a side of a length different from the length of the shorter side of the target image may be set as the trimming candidate area 60. Moreover, a rectangular image may be obtained as the trimming image 40 of the target image. That is, a rectangular area may be set as the trimming candidate area 60.

Figure 24:
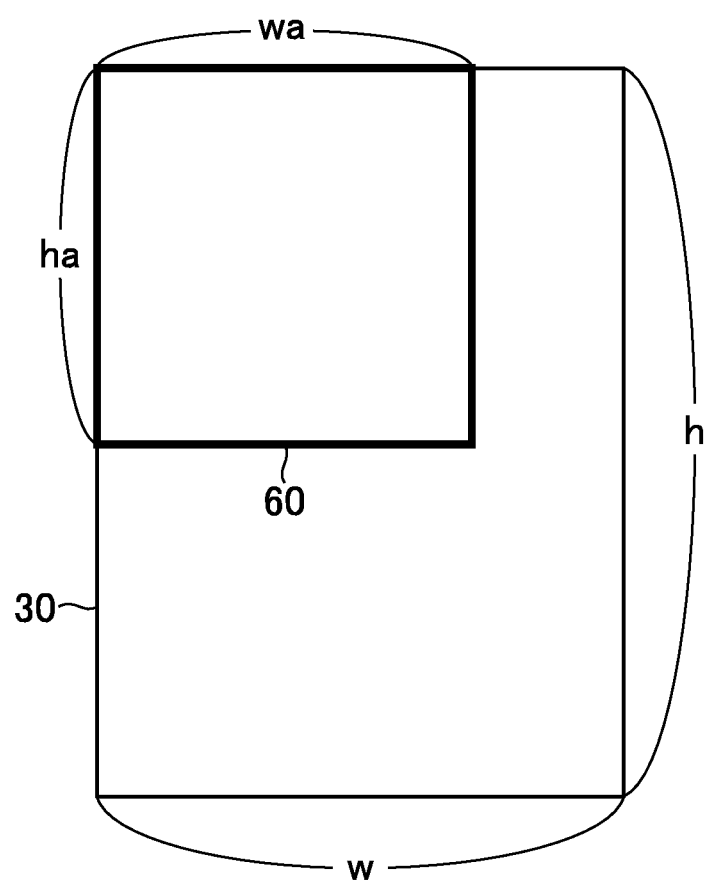
FIG. 24 is a flowchart showing another example of the trimming candidate area.
Figure 25:
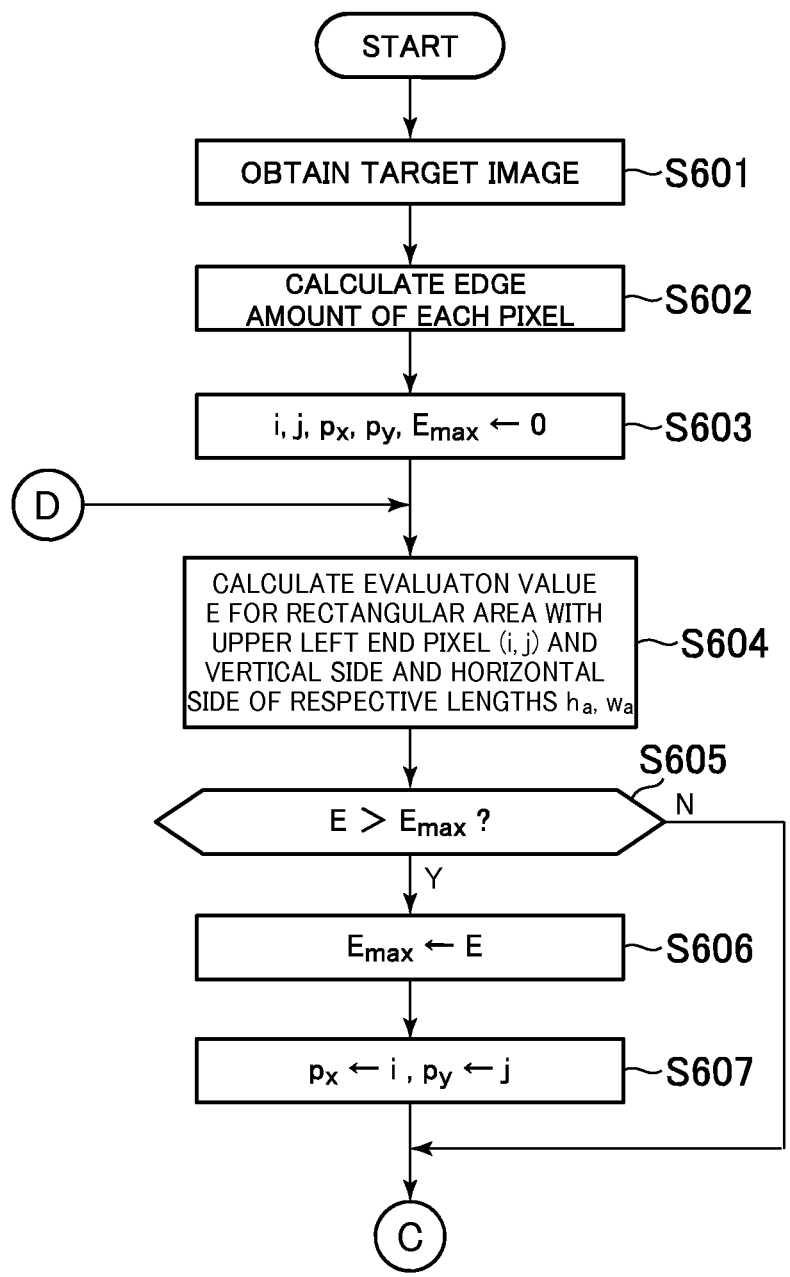
FIG. 25 is a flowchart showing another example of processing executed in the image processing device.
Figure 26:
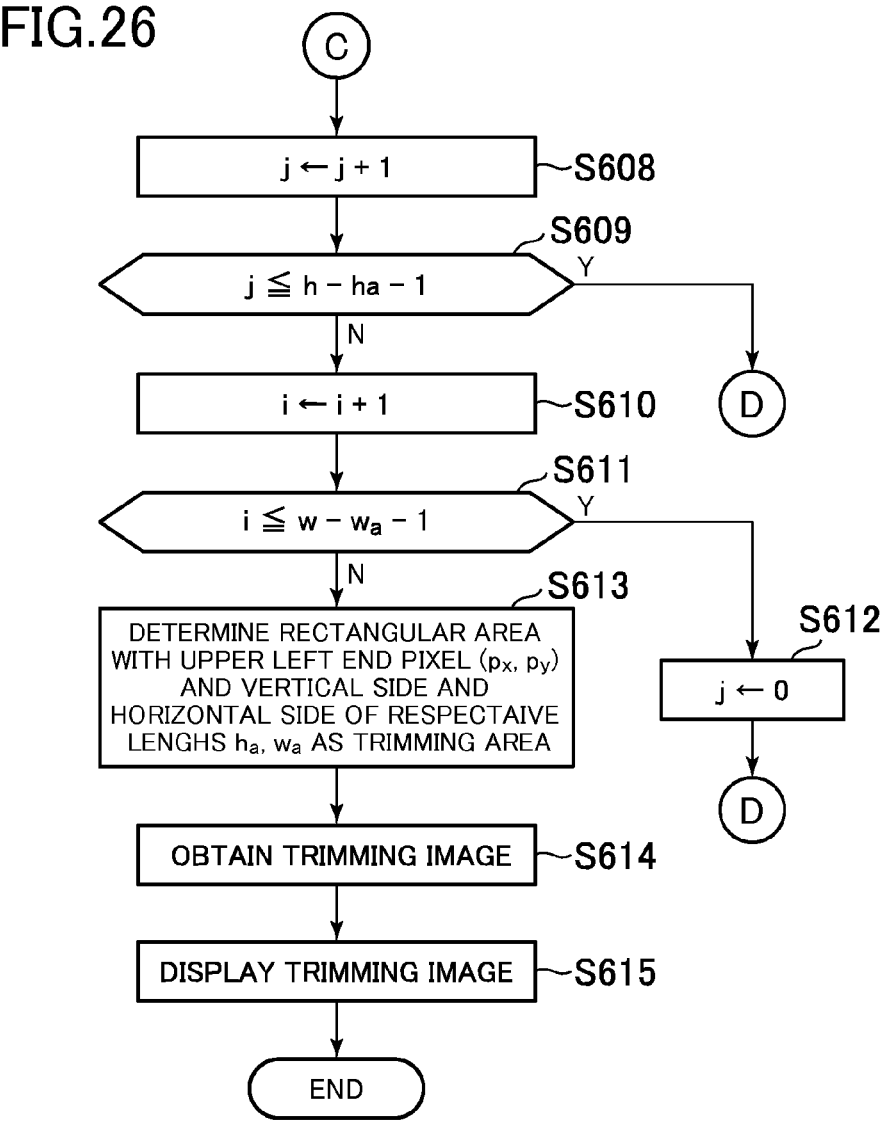
FIG. 26 is a flowchart showing another example of processing executed in the image processing device.

A case will be described below in which a rectangular image having a vertical side of a length ha and a horizontal side of a length wa is obtained as the trimming image 40. That is, a case will be described below in which a rectangular area having a vertical side of a length ha and a horizontal side of a length wa, such as is shown in FIG. 24, is set as the trimming candidate area 60. FIGS. 25 and 26 are flowcharts showing one example of processing that is executed in the image processing device 10 in the case where the above described rectangular image as the trimming image 40 is obtained.

As shown in FIG. 25, initially, the control unit 11 obtains a target image from the database 20 (S601). Then, the control unit 11 calculates the edge amount of each pixel in the target image (S602). The processing at steps S601 and S602 is similar to that at step S101 and S102 in FIG. 12.

Further, the control unit 11 initializes the variables i, j, $p_x$, $p_y$, $E_{max}$ to zero (S603). Then, the control unit 11 calculates an evaluation value E for a rectangular area (the trimming candidate area 60) having an upper left end pixel at (i, j) and a vertical side and a horizontal side of lengths ha, wa, respectively (S604). The processing at step S604 is similar to that at steps S105 and S112 in FIG. 12.

After execution of the processing at step S604, the control unit 11 determines whether or not the evaluation value E calculated at step S604 is larger than the variable $E_{max}$ (S605). When the evaluation value E is larger than the variable $E_{max}$, the control unit 11 sets the variable $E_{max}$ to the evaluation value E calculated at step S604 (S606). Further, the control unit 11 sets the variables $p_x$, $p_y$ to the variables i, j, respectively (S607). With the processing at steps S605 to S607, the variable $E_{max}$ results in indicating the maximum value of the evaluation value E, and the variables $p_x$, $p_y$ result in indicating the values of the variables i, j when the evaluation value E is maximized.

When the processing at steps S606, S607 is executed or it is determined at step S605 that the evaluation value E is not larger than the variable $E_{max}$, the control unit 11 adds one to the variable j (S608). Then, the control unit 11 determines whether or not the variable j is equal to or smaller than the value (h−ha−1) (S609).

When the variable j is equal to or smaller than the value (h−ha−1), the control unit 11 examines again the processing at step S604. Meanwhile, when the variable j is not equal to or smaller than the value (h−ha−1), the control unit 11 adds one to the variable i (S610). Thereafter, the control unit 11 determines whether or not the variable i is equal to or smaller than the value (w−wa−1) (S611).

When the variable i is equal to or smaller than the value (w−wa−1), the control unit 11 initializes the variable j to zero (S612), and examines again the processing at step S604. Meanwhile, when the variable i is not equal to or smaller than the value (w−wa−1), the control unit 11 determines a rectangular area having an upper left end pixel at ($p_x$, $p_y$) and a vertical side ha and a horizontal side wa as the trimming area (S613).

Then, the control unit 11 obtains the trimming image 40 (S614). That is, the control unit 11 cuts out an image shown in the trimming area determined at step S613 from the target image to thereby obtain the trimming image 40. Then, the control unit 11 stores the trimming image 40 in the database 20 so as to be correlated to the target image. Further, the control unit 11 displays the trimming image 40 obtained at step S614 on the display unit 16 (S615). With the above, description on the processing shown in FIGS. 25 and 26 is finished.

[2] For example, when there is a part that is adjacent to an end part of the trimming image 40 obtained by the trimming image obtaining unit 56 and that includes no pixel with the edge amount equal to or larger than a reference amount, the trimming image obtaining unit 56 may remove that part.

Figure 27:
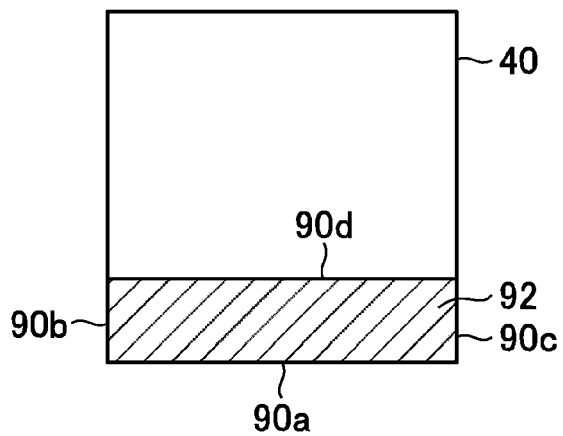
FIG. 27 explains a trimming image obtaining unit.

FIG. 27 shows one example of the trimming image 40. In FIG. 27, the reference numeral 90a indicates a first side of the trimming image 40, the reference numerals 90b, 90c indicate second and third sides, respectively, of the trimming image 40 that are orthogonal to the first side 90a, and the reference numeral 90d indicates a straight line in parallel to the first side 90a and orthogonal to the second side 90b and the third side 90c. The diagonally lined area 92 in the trimming image 40 is an area enclosed by the first side 90a, the second side 90b, the third side 90c, and the straight line 90d. For example, in the case of absence of a pixel with the edge amount equal to or larger than the reference amount in the diagonally lined area 92, the trimming image obtaining unit 56 may remove the diagonally lined area 92 from the trimming image 40.

For example, when no pixel with the edge amount equal to or larger than the reference amount is included in the diagonally lined area 92 of the trimming image 40 obtained from the cooking image 30, the diagonally lined area 92 may often be an area not showing food but showing a table or the like, for example. Therefore, the above described arrangement enables elimination of an unnecessary area.

[3] For example, although it is described in the above that the cooking image contributed by the contributor is stored in the database 20, an image stored in the database 20 is not limited to the cooking image 30. The present invention can be applied to a case in which a trimming image (a thumbnail image) is generated from an image other than the cooking image 30.

The invention claimed is:

1. An image processing device, comprising:
   a setting unit that sets a plurality of trimming candidate areas in a target image;
   a calculation unit that calculates, with respect to each of the plurality of trimming candidate areas, a total value of edge amounts of pixels in the trimming candidate area;
   a determination unit that determines a trimming area from among the plurality of trimming candidate areas, based on the total value of each of the plurality of trimming candidate areas; and
   an obtaining unit that obtains an image in the trimming area,
   wherein the calculation unit calculates the total value of edge amounts of each of the pixels in the trimming candidate area, by summing up the edge amounts of each of the individual pixels in the trimming candidate area to thereby calculate the total value of the trimming candidate area, and
   the determination unit comprises a unit that determines a trimming candidate area of which the total value is a maximum among the plurality of trimming candidate areas as the trimming area.

2. The image processing device according to claim 1, wherein
   the edge amount is an amount relevant to a difference in brightness between a pixel and a pixel around the pixel.

3. The image processing device according to claim 1, wherein
   the edge amount is an amount relevant to a difference in hue between a pixel and a pixel around the pixel.

4. The image processing device according to claim 1, wherein
   the setting unit sets a partial area in the target image as a trimming candidate area, and moves the trimming candidate area vertically and/or horizontally in the target image to thereby set the plurality of trimming candidate areas.

5. An image processing device, comprising:
   a setting unit that sets a plurality of trimming candidate areas in a target image;
   a calculation unit that calculates, with respect to each of the plurality of trimming candidate areas, a total value of edge amounts of pixels in the trimming candidate area;

a determination unit that determines a trimming area from among the plurality of trimming candidate areas, based on the total value of each of the plurality of trimming candidate areas; and an obtaining unit that obtains an image in the trimming area, wherein the calculation unit calculates the total value of edge amounts of each of the pixels in the trimming candidate area, by summing up the edge amounts of each of the individual pixels in the trimming candidate area to thereby calculate the total value of the trimming candidate area, the image processing device further comprises a second calculation unit that calculates, with respect to each of the plurality of trimming candidate areas, a divided value or an inverted value thereof, the divided value being obtained by dividing the total value of the trimming candidate area by the total value of edge amounts of pixels in at least one boundary part of the trimming candidate area, and the determination unit determines the trimming area from among the plurality of trimming candidate areas, based on the divided value or the inverted value of each of the plurality of trimming candidate areas.

6. The image processing device according to claim 5, wherein the determination unit comprises a unit that determines a trimming candidate area of which the divided value is a maximum or a trimming candidate area of which the inverted value is a minimum among the plurality of trimming candidate areas as the trimming area.

7. The image processing device according to claim 5, further comprising:

a unit that calculates, with respect to each of the plurality of trimming candidate areas, a total value of edge amounts of pixels in a first boundary part of the trimming candidate area as a first total value; and a unit that calculates, with respect to each of the plurality of trimming candidate areas, a total value of edge amounts of pixels in a second boundary part of the trimming candidate area as a second total value, the second boundary part being opposite to the first boundary part, wherein the second calculation unit calculates, with respect to each of the plurality of trimming candidate areas, a divided value or an inverted value thereof, the divided value being obtained by dividing the total value of the trimming candidate area by larger one of the first total value and the second total value of the trimming candidate area.

8. An image processing device, comprising:

a setting unit that sets a plurality of trimming candidate areas in a target image;

a calculation unit that calculates, with resect to each of the plurality of trimming candidate areas, a total value of edge amounts of pixels in the trimming candidate area;

a determination unit that determines a trimming area from among the plurality of trimming candidate areas, based on the total value of each of the plurality of trimming candidate areas; and an obtaining unit that obtains an image in the trimming area, wherein the calculation unit calculates the total value of edge amounts of each of the pixels in the trimming candidate area, by summing up the edge amounts of each of the individual pixels in the trimming candidate area to thereby calculate the total value of the trimming candidate area, the calculation unit calculates a weighted total value of the edge amounts of the pixels in the trimming candidate area as the total value of the edge amounts of the pixels in the trimming candidate area, and the calculation unit sets a higher weight for an edge amount of a first pixel in a middle part of the trimming candidate area than a weight for an edge amount of a second pixel in a boundary part of the trimming candidate area.

9. An image processing device, comprising:

a setting unit that sets a plurality of trimming candidate areas in a target image;

a calculation unit that calculates, with respect to each of the plurality of trimming candidate areas, a total value of edge amounts of pixels in the trimming candidate area;

a determination unit that determines a trimming area from among the plurality of trimming candidate areas, based on the total value of each of the plurality of trimming candidate areas; and an obtaining unit that obtains an image in the trimming area, wherein the calculation unit calculates the total value of edge amounts of each of the pixels in the trimming candidate area, by summing up the edge amounts of each of the individual pixels in the trimming candidate area to thereby calculate the total value of the trimming candidate area, and the image processing device further comprises a unit that removes a part which includes an end part of the image in the trimming area, but does not include a pixel of which an edge amount is equal to or larger than a reference amount.

10. An image processing device, comprising:

a setting unit that sets a plurality of trimming candidate areas in a target image;

a calculation unit that calculates, with respect to each of the plurality of trimming candidate areas, a total value of edge amounts of pixels in the trimming candidate area;

a determination unit that determines a trimming area from among the plurality of trimming candidate areas, based on the total value of each of the plurality of trimming candidate areas; and an obtaining unit that obtains an image in the trimming area, wherein the calculation unit calculates the total value of edge amounts of each of the pixels in the trimming candidate area, by summing up the edge amounts of each of the individual pixels in the trimming candidate area to thereby calculate the total value of the trimming candidate area, the image processing device further comprises storage that stores correlation data for correlating distribution pattern information to each of a plurality of different kinds of trimming area determination processings for determining the trimming area from among the plurality of trimming candidate areas, the distribution pattern information being information on a distribution pattern of an edge amount of an image, and the determination unit determines the trimming area from among the plurality of trimming candidate areas based on the total value of each of the plurality of trimming candidate areas, through trimming area determination processing correlated to a distribution pattern of an edge amount of the target image.

11. The image processing device according to claim 10, wherein
the determination unit comprises a unit that determines a plurality of trimming areas corresponding to the plurality of different kinds of trimming area determination processings by determining the trimming area from among the plurality of trimming candidate areas based on the total value of each of the plurality of trimming candidate areas, through each of the plurality of different kinds of trimming area determination processings, and
the image processing device further comprises:
a display control unit that displays images in the plurality of trimming areas on a display unit;
a receiving unit that receives at least one image selected by a user among the images in the plurality of trimming areas; and
an update unit that updates the correlation data based on a result of selection by the user.

12. The image processing device according to claim 10, wherein
the plurality of different kinds of trimming area determination processings include:
trimming area determination processing for determining a trimming candidate area of which the total value is a maximum among the plurality of trimming candidate areas as the trimming area, and
trimming area determination processing for determining a trimming candidate area of which a divided value is a maximum among the plurality of trimming candidate areas as the trimming area, the divided value being obtained by dividing the total value by a total value of edge amounts of pixels in at least one boundary part of the trimming candidate area.

13. The image processing device according to claim 10, wherein
the calculation unit comprises:
a first calculation unit that calculates, with respect to each of the plurality of trimming candidate areas, a total value of first edge amounts of pixels in the trimming candidate area as a first total value, and
a second calculation unit that calculates, with respect to each of the plurality of trimming candidate areas, a total value of second edge amounts of pixels in the trimming candidate area as a second total value,
the first edge amount is an amount relevant to a difference in hue between a pixel and a pixel around the pixel,
the second edge amount is an amount relevant to a difference in brightness between a pixel and a pixel around the pixel, and
the plurality of different kinds of trimming area determination processings include:
trimming area determination processing for determining a trimming area from among the plurality of trimming candidate areas based on the first total value of each of the plurality of trimming candidate areas, and
trimming area determination processing for determining a trimming area from among the plurality of trimming candidate areas based on the second total value of each of the plurality of trimming candidate areas.

14. An image processing device, comprising:
a setting unit that sets a plurality of trimming candidate areas in a target image;
a calculation unit that calculates, with respect to each of the plurality of trimming candidate areas, a total value of edge amounts of pixels in the trimming candidate area;
a determination unit that determines a trimming area from among the plurality of trimming candidate areas, based on the total value of each of the plurality of trimming candidate areas; and
an obtaining unit that obtains an image in the trimming area,
wherein the calculation unit calculates the total value of edge amounts of each of the pixels in the trimming candidate area, by summing up the edge amounts of each of the individual pixels in the trimming candidate area to thereby calculate the total value of the trimming candidate area,
the image processing device further comprises storage that stores correlation data for correlating distribution pattern information to each of a plurality of different kinds of trimming area determination processings for determining the trimming area from among the plurality of trimming candidate areas, the distribution pattern information being information on a distribution pattern of an edge amount of an image, and
the determination unit comprises a unit that determines a plurality of trimming areas corresponding to the plurality of different kinds of trimming area determination processings by determining the trimming area from among the plurality of trimming candidate areas based on the total value of each of the plurality of trimming candidate areas, through each of the plurality of different kinds of trimming area determination processings,
the image processing device further comprises:
a display control unit that displays images in the plurality of trimming areas on a display unit; and
a receiving unit that receives at least one image selected by a user among the images in the plurality of trimming areas; and
the display control unit displays preferentially or distinctively an image in a trimming area corresponding to trimming area determination processing correlated to a distribution pattern of an edge amount of the target image, among the images in the plurality of trimming areas.

15. The image processing device according to claim 14, further comprising an update unit that updates the correlation data based on a result of selection by the user.

16. A method for controlling an image processing device, the method comprising:
setting a plurality of trimming candidate areas in a target image;
calculating, with respect to each of the plurality of trimming candidate areas, a total value of edge amounts of pixels in the trimming candidate area;
determining a trimming area from among the plurality of trimming candidate areas, based on the total value of each of the plurality of trimming candidate areas; and
obtaining an image in the trimming area,
wherein the calculating calculates the total value of edge amounts of each of the pixels in the trimming candidate area, by summing up the edge amounts of each of the individual pixels in the trimming candidate area to thereby calculate the total value of the trimming candidate area, and
the determining comprises determining a trimming candidate area of which the total value is a maximum among the plurality of trimming candidate areas as the trimming area.

17. A method for controlling an image processing device, the method comprising:

setting a plurality of trimming candidate areas in a target image;

calculating, with respect to each of the plurality of trimming candidate areas, a total value of edge amounts of pixels in the trimming candidate area;

determining a trimming area from among the plurality of trimming candidate areas, based on the total value of each of the plurality of trimming candidate areas; and obtaining an image in the trimming area, wherein the calculating calculates the total value of edge amounts of each of the pixels in the trimming candidate area, by summing up the edge amounts of each of the individual pixels in the trimming candidate area to thereby calculate the total value of the trimming candidate area, the method further comprises calculating, with respect to each of the plurality of trimming candidate areas, a divided value or an inverted value thereof, the divided value being obtained by dividing the total value of the trimming candidate area by the total value of edge amounts of pixels in at least one boundary part of the trimming candidate area, and the determining determines the trimming area from among the plurality of trimming candidate areas, based on the divided value or the inverted value of each of the plurality of trimming candidate areas.

18. A method for controlling an image processing device, the method comprising:

setting a plurality of trimming candidate areas in a target image;

calculating, with respect to each of the plurality of trimming candidate areas, a total value of edge amounts of pixels in the trimming candidate area;

determining a trimming area from among the plurality of trimming candidate areas, based on the total value of each of the plurality of trimming candidate areas; and obtaining an image in the trimming area, wherein the calculating calculates the total value of edge amounts of each of the pixels in the trimming candidate area, by summing up the edge amounts of each of the individual pixels in the trimming candidate area to thereby calculate the total value of the trimming candidate area, the calculating calculates a weighted total value of the edge amounts of the pixels in the trimming candidate area as the total value of the edge amounts of the pixels in the trimming candidate area, and the calculating sets a higher weight for an edge amount of a first pixel in a middle part of the trimming candidate area than a weight for an edge amount of a second pixel in a boundary part of the trimming candidate area.

19. A method for controlling an image processing device, the method comprising:

setting a plurality of trimming candidate areas in a target image;

calculating, with respect to each of the plurality of trimming candidate areas, a total value of edge amounts of pixels in the trimming candidate area;

determining a trimming area from among the plurality of trimming candidate areas, based on the total value of each of the plurality of trimming candidate areas; and obtaining an image in the trimming area, wherein the calculating calculates the total value of edge amounts of each of the pixels in the trimming candidate area, by summing up the edge amounts of each of the individual pixels in the trimming candidate area to thereby calculate the total value of the trimming candidate area, and the method further comprises removing a part which includes an end part of the image in the trimming area, but does not include a pixel of which an edge amount is equal to or larger than a reference amount.

20. A method for controlling an image processing device, the method comprising:

setting a plurality of trimming candidate areas in a target image;

calculating, with respect to each of the plurality of trimming candidate areas, a total value of edge amounts of pixels in the trimming candidate area;

determining a trimming area from among the plurality of trimming candidate areas, based on the total value of each of the plurality of trimming candidate areas; and obtaining an image in the trimming area, wherein the calculating calculates the total value of edge amounts of each of the pixels in the trimming candidate area, by summing up the edge amounts of each of the individual pixels in the trimming candidate area to thereby calculate the total value of the trimming candidate area, the method further comprises referring correlation data for correlating distribution pattern information to each of a plurality of different kinds of trimming area determination processings for determining the trimming area from among the plurality of trimming candidate areas, the distribution pattern information being information on a distribution pattern of an edge amount of an image, and the determining determines the trimming area from among the plurality of trimming candidate areas based on the total value of each of the plurality of trimming candidate areas, through trimming area determination processing correlated to a distribution pattern of an edge amount of the target image.

21. A method for controlling an image processing device, the method comprising:

setting a plurality of trimming candidate areas in a target image;

calculating, with respect to each of the plurality of trimming candidate areas, a total value of edge amounts of pixels in the trimming candidate area;

determining a trimming area from among the plurality of trimming candidate areas, based on the total value of each of the plurality of trimming candidate areas; and obtaining an image in the trimming area, wherein the calculating calculates the total value of edge amounts of each of the pixels in the trimming candidate area, by summing up the edge amounts of each of the individual pixels in the trimming candidate area to thereby calculate the total value of the trimming candidate area, the method further comprises referring correlation data for correlating distribution pattern information to each of a plurality of different kinds of trimming area determination processings for determining the trimming area from among the plurality of trimming candidate areas, the distribution pattern information being information on a distribution pattern of an edge amount of an image, the determining comprises determining a plurality of trimming areas corresponding to the plurality of different kinds of trimming area determination processings by determining the trimming area from among the plurality of trimming candidate areas based on the total value of each of the plurality of trimming candidate areas, through each of the plurality of different kinds of trimming area determination processings, the method further comprises:
- displaying images in the plurality of trimming areas on a display; and
- receiving at least one image selected by a user among the images in the plurality of trimming areas; and the displaying displays preferentially or distinctively an image in a trimming area corresponding to trimming area determination processing correlated to a distribution pattern of an edge amount of the target image, among the images in the plurality of trimming areas.

\* \* \* \* \*